(12) United States Patent
Takeguchi et al.

(10) Patent No.: US 8,320,278 B2
(45) Date of Patent: Nov. 27, 2012

(54) COMMUNICATION DEVICE, SYSTEM AND METHOD TO FORM COMMUNICATION ROUTE

(75) Inventors: Koji Takeguchi, Kawasaki (JP); Masakazu Bamba, Kawasaki (JP); Yasuko Nozu, Kawasaki (JP); Katsuhiro Shirai, Kawasaki (JP)

(73) Assignee: Fujitsu Limited, Kawaskai (JP)

( * ) Notice: Subject to any disclaimer, the term of this patent is extended or adjusted under 35 U.S.C. 154(b) by 305 days.

(21) Appl. No.: 12/640,301

(22) Filed: Dec. 17, 2009

(65) Prior Publication Data

US 2010/0165987 A1 Jul. 1, 2010

(30) Foreign Application Priority Data

Dec. 26, 2008 (JP) ................................. 2008-332716

(51) Int. Cl.
*H04L 12/28* (2006.01)
(52) U.S. Cl. ........................................ 370/254; 370/255
(58) Field of Classification Search .................. 709/238; 370/252, 254, 255, 238, 400, 437, 468
See application file for complete search history.

(56) References Cited

U.S. PATENT DOCUMENTS

| | | | | |
|---|---|---|---|---|
| 6,078,946 A * | 6/2000 | Johnson | ........................ | 709/200 |
| 6,477,582 B1 * | 11/2002 | Luo et al. | ....................... | 709/241 |
| 7,613,122 B2 * | 11/2009 | Nishimura | ..................... | 370/238 |
| 7,643,428 B1 * | 1/2010 | Dwekat et al. | ................ | 370/241 |
| 2003/0011844 A1 * | 1/2003 | Park et al. | ..................... | 359/128 |
| 2003/0063613 A1 * | 4/2003 | Carpini et al. | ................ | 370/401 |
| 2003/0161338 A1 * | 8/2003 | Ng et al. | ........................ | 370/437 |
| 2004/0039839 A1 * | 2/2004 | Kalyanaraman et al. | ..... | 709/238 |
| 2004/0202112 A1 | 10/2004 | McAllister et al. | | |
| 2006/0002366 A1 * | 1/2006 | Kawaguchi et al. | .......... | 370/349 |
| 2006/0140167 A1 * | 6/2006 | Nishimura | ..................... | 370/351 |
| 2008/0239958 A1 * | 10/2008 | Murray et al. | ................ | 370/235 |
| 2009/0073876 A1 * | 3/2009 | Kimmich et al. | ............. | 370/229 |
| 2009/0073893 A1 * | 3/2009 | Vu Duong et al. | ............ | 370/253 |

FOREIGN PATENT DOCUMENTS

| | | |
|---|---|---|
| JP | 10-164083 | 6/1998 |
| JP | 2002-300192 | 11/2002 |

* cited by examiner

*Primary Examiner* — Chuong T Ho
(74) *Attorney, Agent, or Firm* — Staas & Halsey LLP

(57) ABSTRACT

There is provided a communication device including a score information storage unit to store score information indicating a score as an evaluated value of a communication path; a receiver unit to receive a route connection notice including current score information; a routing unit to acquire the score information stored in the score information storage unit, and select the communication path next to the communication path based on the acquired score information of the communication path; a score updating unit to add a score of the communication path selected by the routing unit to the current score of the partial communication route indicated by the current score information, and update the current score information to the added score as a new current score; and a transmission unit to transmit the route connection notice including the current score information.

20 Claims, 18 Drawing Sheets

FIG. 7

SCORE TABLE 151A

| SERVICE LEVEL VALUE | SERVICE LEVEL TYPE | SCORE |
|---|---|---|
| 9 | UN-PROTECTION | 10 |
| 31 | 1+1 PROTECTION | 30 |
| 41 | UPSR | 40 |
| 51 | 2F-BLSR | 50 |

FIG. 17

SCORE TABLE 151B

| SERVICE LEVEL VALUE | SERVICE LEVEL TYPE | SCORE |
|---|---|---|
| 9 | UN-PROTECTION | 10 |
| 31 | 1+1 PROTECTION | 30 |
| 41 | UPSR | 40 |
| 51 | 2F-BLSR | 50 |
| 61 | 4F-BLSR | 60 |

US 8,320,278 B2

COMMUNICATION DEVICE, SYSTEM AND METHOD TO FORM COMMUNICATION ROUTE

CROSS-REFERENCE TO RELATED APPLICATION

This application is based upon and claims the benefit of priority of the prior Japanese Patent Application No. 2008-332716, filed on Dec. 26, 2008, the entire contents of which are incorporated herein by reference.

FIELD

The embodiments discussed herein are related to a communication device, a communication system and a communication method to form a communication route.

BACKGROUND

Generally a communication route formed by a plurality of communication devices is controlled by the control plane so as to establish the end-to-end path route over such a communication network as the optical transmission network. The service level on the communication route is designated by the minimum condition of the communication path required by the user during signaling for setting the route. Determination with respect to establishment of the condition required by the user upon formation of the communication route allows an arbitrary portion of the communication route to be set for assuring the user's request. (Refer to Japanese Laid-open Patent Publication No. 2002-300192.)

SUMMARY

According to an aspect of the embodiment, there is provided a communication device being operable to form a communication route, the communication device including a score information storage unit being operable to store score information indicating a score as an evaluated value of a communication path connecting to an adjacent communication device; a receiver unit being operable to receive a route connection notice including current score information indicating a current score as an evaluated value of a partial communication route from a communication device being at a starting point on the communication route to the communication path that has been routed on the communication route; a routing unit being operable to acquire the score information stored in the score information storage unit, and select the communication path next to the communication path that has been routed as a part of the communication route based on the acquired score information of the communication path; a score updating unit being operable to add a score of the communication path selected by the routing unit to the current score of the partial communication route indicated by the current score information received by the receiver unit, the score being acquired based on the score information stored in the score information storage unit, and update the current score information to the added score as a new current score; and a transmission unit being operable to transmit the route connection notice including the current score information updated by the score updating unit to a next adjacent communication device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an exemplary structure of a score table according to the first embodiment;

FIG. 17 is a diagram illustrating an exemplary structure of a score table according to the second embodiment.

DESCRIPTION OF EMBODIMENTS

In the case where the service level required by the user fails to be satisfied at any portion of the set communication route in the generally employed communication system, such communication route may not be set.

Figure 18:
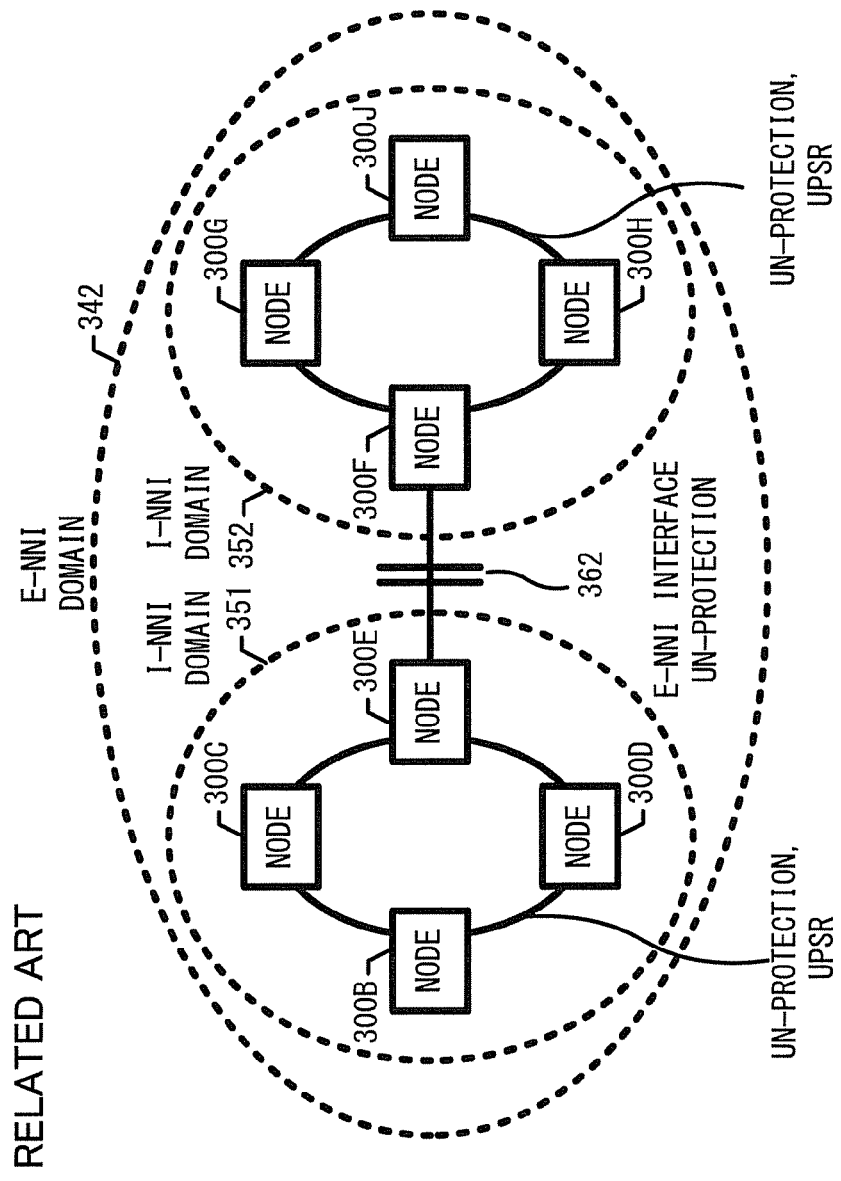
FIG. 18 is a diagram illustrating a generally employed communication system.

FIG. 18 is a diagram illustrating a generally employed communication system. The communication system provided with nodes 300B to 300J illustrated in FIG. 18 will be described in detail. The communication system illustrated in FIG. 18 includes an E-NNI domain (External-Network to Network Interface domain) 342. The E-NNI domain 342 includes I-NNI domains (Internal-Network to Network Interface domains) 351, 352. It is assumed that UPSR (Unidirectional Path Switched Ring) is designated as the required service level in the communication system to form the communication route from the node 300B to the node 300J. On the aforementioned assumption, both the I-NNI domains 351 and 352 are allowed to use Un-protection and UPSR, and the E-NNI interface 362 is allowed to use only Un-protection as the service level. The UPSR redundancy may not be introduces into the E-NNI interface 362 which is available only at the level of Un-protection. Thus the required service level in the communication system may not be satisfied, and accordingly, the communication route from the nodes 300B to 300J may not be formed.

The actual communication network has many channels through the plural E-NNI domains. There may be the case where the communication route is required to be formed by allowing redundancy of the redundant portion such as the inside of the I-NNI domain while allowing the indirect portion as the non-redundant portion.

First Embodiment

Figure 1:
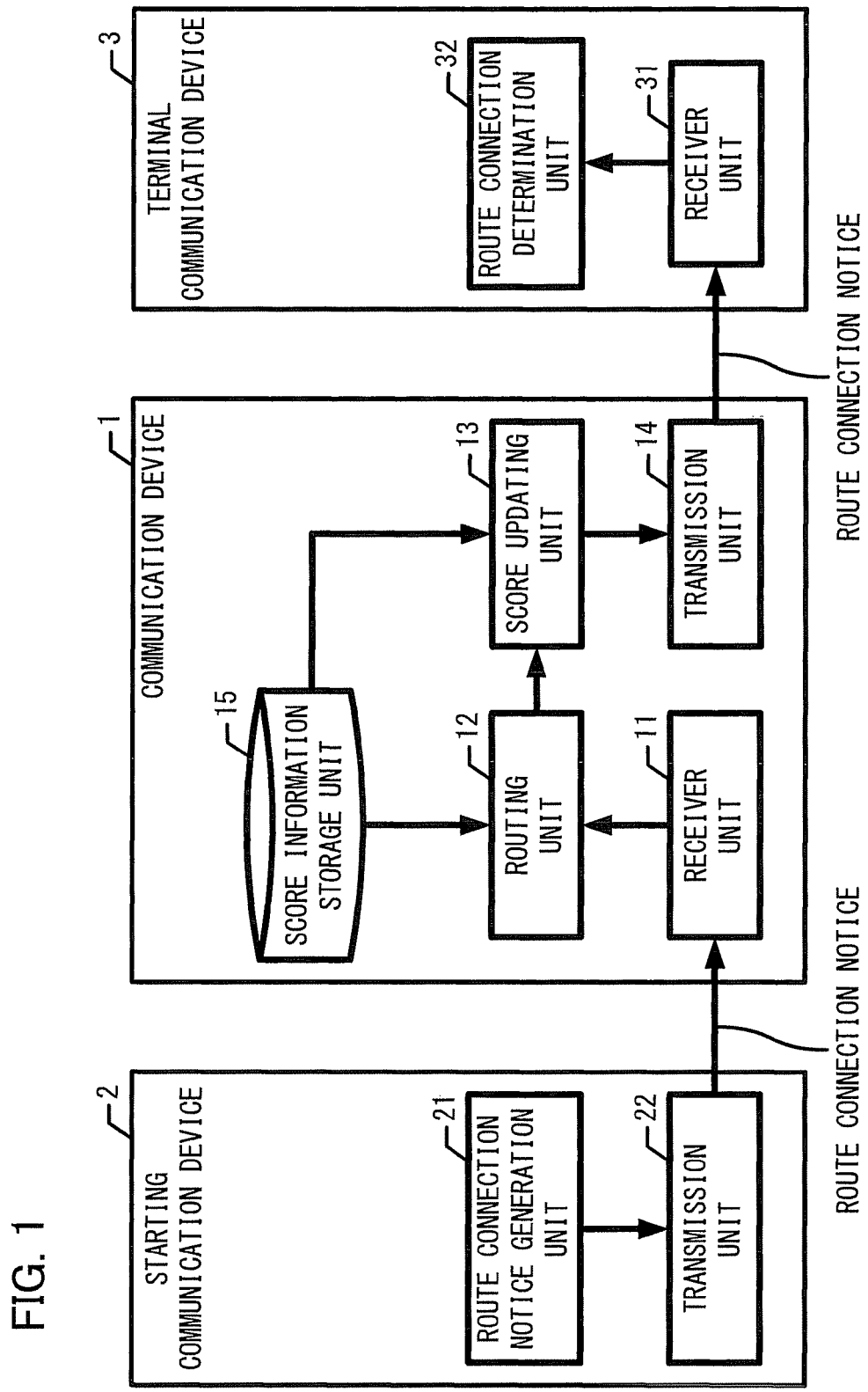
FIG. 1 is a diagram schematically illustrating present embodiments.

An embodiment will be described referring to the drawings. FIG. 1 is a diagram schematically illustrating the embodiments. A communication device 1 illustrated in FIG. 1 forms a communication route with other communication devices, and serves to set the communication route. The communication route is required by a user to be formed from a starting point to a terminal end on the communication system. The communication path is a physical or a logical link for connecting adjacent communication devices of the communication route on the communication system.

The communication device 1 includes a receiver unit 11, a routing unit 12, a score updating unit 13, a transmission unit 14, and a score information storage unit 15 for forming the communication route with the other communication device. The communication device 1 serves as a relaying communication device on the communication route having a starting communication device 2 as the starting point and a terminal communication device 3 as the terminal end. On the communication route, an additional communication device (not illustrated) with the same structure as that of the communication device 1 may be provided as the relay device between the starting communication device 2 and the terminal communication device 3.

The receiver unit 11 receives a route connection notice which includes the current score information transmitted from a preceding communication device on the communication route (the transmission unit of another communication device for relaying (not illustrated) or a transmission unit 22 of the starting communication device 2). The current score information has information of a part of the communication route which is formed by the communication device 1 and other communication devices based on the user's request, for example. The current score information includes the current score as the value for evaluating the partial communication route from the starting communication device 2 as the starting point of the communication route to the communication path which has been already selected as the part of the communication route on the communication route up to the current time point. The route connection notice is transmitted from the starting communication device 2 based on the use's request for forming the communication route. The route connection notice is generated by a route connection notice generation unit 21.

The routing unit 12 acquires the score information stored in the score information storage unit 15. The routing unit 12 evaluates the communication path based on the acquired score information, and selects the communication path next to the one which has been already selected by a routing unit of the other communication device (not illustrated) on the communication route.

The score updating unit 13 adds a score of the communication path selected by the routing unit 12 based on the score information stored in the score information storage unit 15 to the current score indicated by the current score information included in the route connection notice received by the receiver unit 11. The score updating unit 13 then updates the current score information by setting the added result as the new current score.

The transmission unit 14 transmits the route connection notice which includes the current score information updated by the score updating unit 13 to the next communication device (the communication device (not illustrated) for relaying or the terminal communication device 3) on the communication route. The route connection notice transmitted from the transmission unit 14 is received by a receiver unit 31 of the terminal communication device 3 directly or via another communication device. A route connection determination unit 32 of the terminal communication device 3 determines whether or not the communication route is formed based on the score information included in the route connection notice received by the receiver unit 31.

The score information storage unit 15 stores the score information representing the score as the value for evaluating the communication path for connecting the adjacent communication devices on the communication route. The score information is set by a manager of the communication system or a user who requires forming the communication route on the communication system. The score is set in the score information such that the point corresponding to the superior evaluation on the item focused or emphasized by the user with respect to the service level for each communication path, for example, the reliability of the communication path has a high score, and the point corresponding to the inferior evaluation has a low score.

In the above-mentioned communication device 1, the receiver unit 11 receives the route connection notice which includes the current score information. The routing unit 12 selects the next communication path as the part of the communication route based on the score information. The score updating unit 13 adds the score as the evaluation value of the selected communication path to the current score based on the score information, and updates the current score information by setting the added result to the current score. The transmission unit 14 transmits the route connection notice which includes the score information updated by the score updating unit to the next communication device. The score information storage unit 15 stores the score information which represents the score.

The point system for evaluating the respective communication paths on the communication route allows flexible selection of the communication path. This makes it possible to form the communication route at the service level as high as achievable in the communication route.

The communication device according to the embodiment will be described in more detail. It is assumed that a layer 2 switch is employed in the optical transmission network for setting the communication route of end-to-end path especially by the control plane while setting the communication device as the node. However, it may be structured to include various communication devices such as the computer and the layer 3 switch without being limited to the embodiment. Hereafter, the embodiment will be described to have the unit of the layer 2 data for the OSI (Open Systems Interconnection) reference model unified as a frame.

Figure 2:
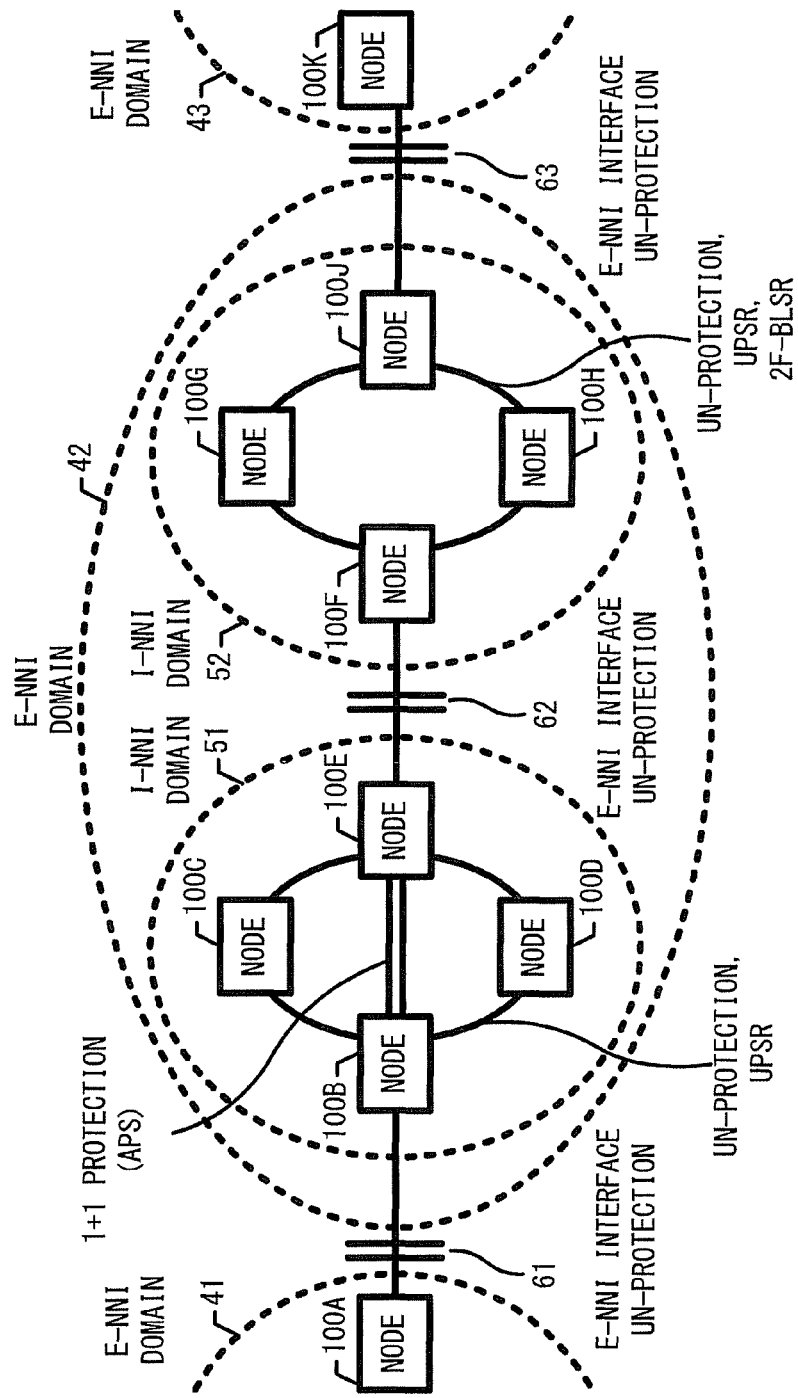
FIG. 2 is a diagram illustrating a general structure of a communication system according to a first embodiment.

FIG. 2 is a diagram illustrating a general structure of a communication system according to a first embodiment. The communication system according to the embodiment is an optical transmission network which allows plural nodes to transfer data in a frame format so as to conduct data transmission/reception between user's terminal devices which are connected to the communication route.

The communication system illustrated in FIG. 2 includes nodes 100A, 100B, 100C, 100D, 100E, 100F, 100G, 100H, 100J, and 100K. Each of those nodes 100A to 100K is the layer 2 switch for conducting the optical transmission.

Each of the respective nodes is connected to a not illustrated terminal device used by the user, and connected to a not illustrated terminal device used by a manager of the communication system for maintaining the communication system by operating an NMS (Network Management System). The terminal device of the manager is connected to the respective nodes for maintaining and managing the respective nodes. The respective nodes are connected with at least one physical link (for example, SONET (Synchronous Optical NETwork)/SDH (Synchronous Digital Hierarchy)). The respective nodes are connected to the terminal device of the manager with at least one physical link or the logical link. Each of the respective nodes has the same structure and the same function.

The nodes belong to the I-NNI domain of the control plane formed of the plural nodes. At this time, the I-NNI domain to which the nodes 100B, 100C, 100D and 100E belong is different from the one to which the nodes 100F, 100G, 100H and 100J belong. Specifically, the nodes 100B, 100C, 100D and 100E belong to the I-NNI domain 51. The nodes 100F, 100G, 100H, and 100J belong to the I-NNI domain 52.

The I-NNI domain 51 may be supported by Un-protection, UPSR, 1+1 protection (APS (Automatic Protection Switching)) as the service level. The I-NNI domain 52 may be supported by Un-protection, UPSR, 2F-BLSR (Two-Fiber Bidirectional Line Switching Ring) as the service level.

Each of the I-NNI domains belongs to an E-NNI domain formed of at least one I-NNI domain. The respective nodes belong to different E-NNI domains (E-NNI domains 41, 42, 43, respectively). For example, The I-NNI domains 51 and 52 belong to the E-NNI domain 42.

The node 100A is connected to the other node (not illustrated), and belongs to a not illustrated I-NNI domain and the E-NNI domain 41 with the other node. Likewise, the node 100K is connected to the other node (not illustrated), and belongs to a not illustrated I-NNI domain and the E-NNI domain 43 with the other node.

The I-NNI domains and the E-NNI domains are connected with the respective E-NNI interfaces. For example, the I-NNI domain of the node 100A and the I-NNI domain 51 are connected with an E-NNI interface 61. Likewise, the I-NNI domains 51 and 52 are connected with an E-NNI interface 62. The I-NNI domain of the node 100K and the I-NNI domain 52 are connected with an E-NNI interface 63. The nodes each located at the end are connected with Un-protection through the respective E-NNI interfaces 61, 62 and 63.

Each of the nodes relays the frame from the user's terminal device as the transmission source to the user's terminal device as the destination based on the address contained in the frame. For example, when the user's terminal device connected to the starting node 100A transmits the frame to the user's terminal device connected to the node 100K as the terminal node indicated by the address contained in the frame, the frame is transmitted from the node 100A to the node 100K via the E-NNI domain 42.

In the example, the starting node which requires connection to the communication route formed by signaling is set as the node 100A. The terminal node as the end terminal of the communication route is set as the node 100K. The relay nodes each potentially serving as the relay of the communication route may be set as the nodes 100B to 100J.

Reference point management on the control plane (in this case, node management) is conducted in the layer structure. The reference point (node) inside each of the domains is processed therein. The contact point (node) for connecting the domains is only recognized by the different domain (outside the aforementioned domain). For example, the node 100E among those belonging to the I-NNI domain 51 may only be recognized by the I-NNI domain 52.

In the embodiment, when the communication is conducted through different domains, the different service level may be applied to the respective domains through signaling between the contact nodes of the respective domains. The processing inside the domain may be executed with the generally employed technology.

It is assumed that the manager and the user of the communication system as illustrated in FIG. 2 know the respective numbers of the I-NNI domains and the E-NNI domains of the communication system, and the service available (selectable) on the inner communication path. Alternatively, it is assumed that the manager and the user are allowed to confirm the respective numbers of the I-NNI domains and the E-NNI domains of the communication system, and the service available on the inner communication path using the function of the control plane, for example.

Figure 3:
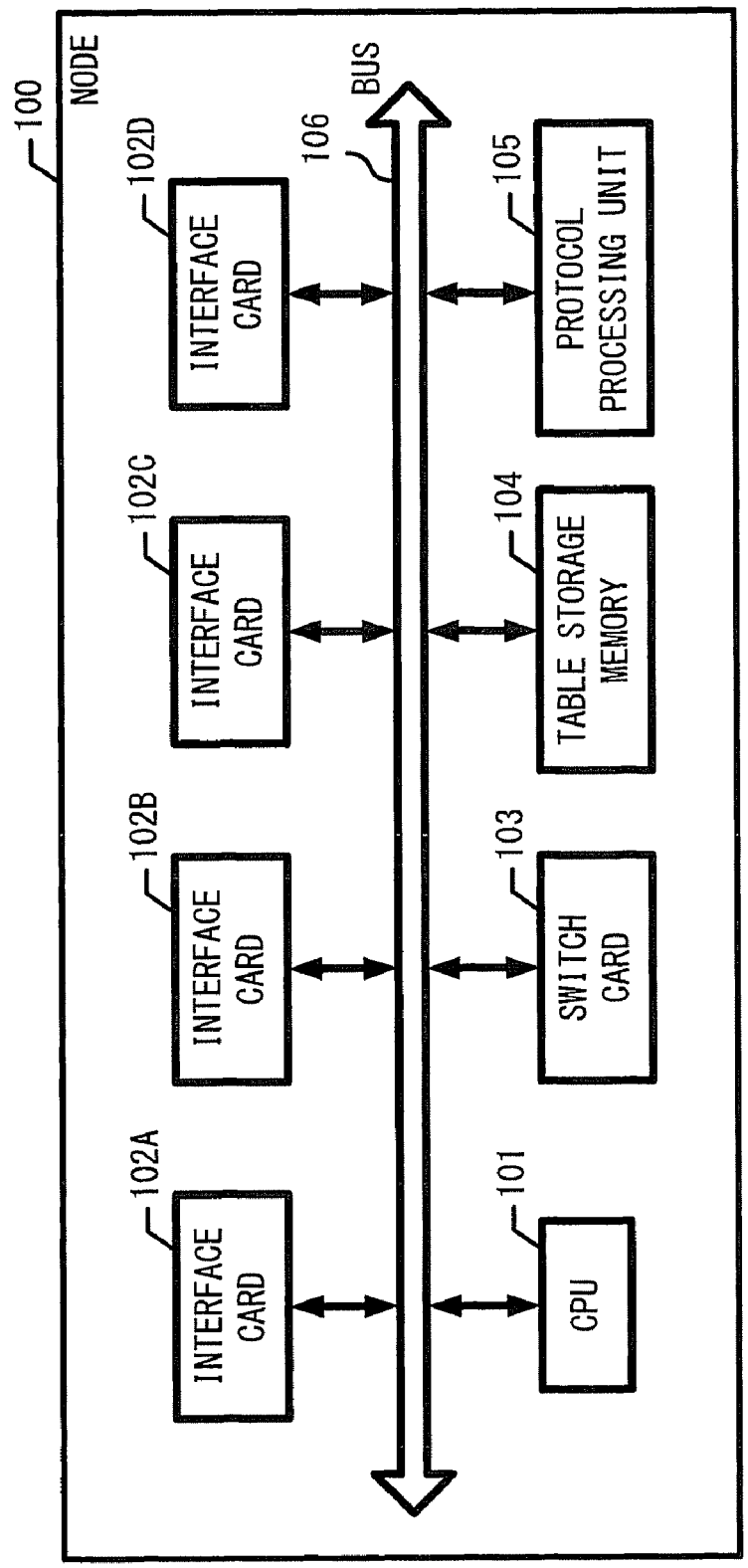
FIG. 3 is a diagram illustrating a hardware structure of a node.

FIG. 3 is a diagram illustrating a hardware structure of the node. Referring to FIG. 3 illustrating the inner structure of the node 100, each of the nodes 100A, 100B, 100C and 100D may be formed to have the same structure. The node 100 includes a CPU (Central Processing Unit) 101, interface cards 102A, 102B, 102C, and 102D, a switch card 103, a table storage memory 104, a protocol processing unit 105, and a bus 106.

The CPU 101 controls the node 100 as a whole. The CPU 101 executes the processing based on the program. The CPU 101 executes the program stored in a not illustrated memory using the data stored therein. The CPU 101 receives the command transmitted from the not illustrated terminal device used by the manager, and responds by sending the execution result with respect to the command to the terminal device.

The table storage memory 104 is formed of a non-volatile memory such as EEPROM (Electrically Erasable and Programmable Read Only Memory) to store plural tables therein. The table stored in the table storage memory 104 includes a score table which will be described referring to FIG. 7, a table for managing the logical link structure, a table for determining the transfer destination of the frame in the logical link, and a table for storing the information which indicates the transfer destination of the frame.

The bus 106 is connected to the CPU 101, the interface cards 102A to 102D, the switch card 103, the table storage memory 104, and the protocol processing unit 105.

The interface cards 102A to 102D execute the process for converting between optical and electric signals. The interface cards 102A to 102D extract and insert a control plane signal.

Each of the interface cards 102A to 102D has plural communication ports (for example, 8). Each of those communication ports may be connected to a physical link. The interface cards 102A to 102D monitor the respective communication ports to acquire the frame. Each of the interface cards 102A to 102D has a buffer for temporarily storing the frame on the chance of simultaneous incoming of the frame to the plural communication ports, and transmits the acquired frame to the switch card 103.

The switch card 103 performs switching of the transmission source/destination (interface cards 102A to 102D) of the electric signal to be transferred inside the node 100 as well as multi-processing and de-multi-processing of the signal.

The switch card 103 includes a not illustrated learn table. The switch card 103 stores the transmission source address of the frame that has been previously received, and the identification information of the communication port or the logical link for receiving the frame in the learn table in correlation with each other. The learn table is updated by the switch card 103 at appropriate timing. Upon reception of the frame from any one of the interface cards 102A to 102D, the switch card 103 refers to the learn table to determine the transfer destination of the frame. If the determined transfer destination is the logical link, the switch card 103 refers to the table stored in the table storage memory 104 to determine the specific interface card for the transfer from those of 102A to 102D, and the communication port. Thereafter, the switch card 103 transmits the frame to the determined interface card among 102A to 102D. The interface card among 102A to 102D which has received the frame transmits the received frame to the transmission destination from the determined communication port.

The protocol processing unit 105 receives a control plane control signal for controlling the control plane from the interface cards 102A to 102D, and processes the signal. Thereafter, the control plane control signal is transferred to the interface cards 102A to 102D to transfer the control plane to the next node.

Figure 4:
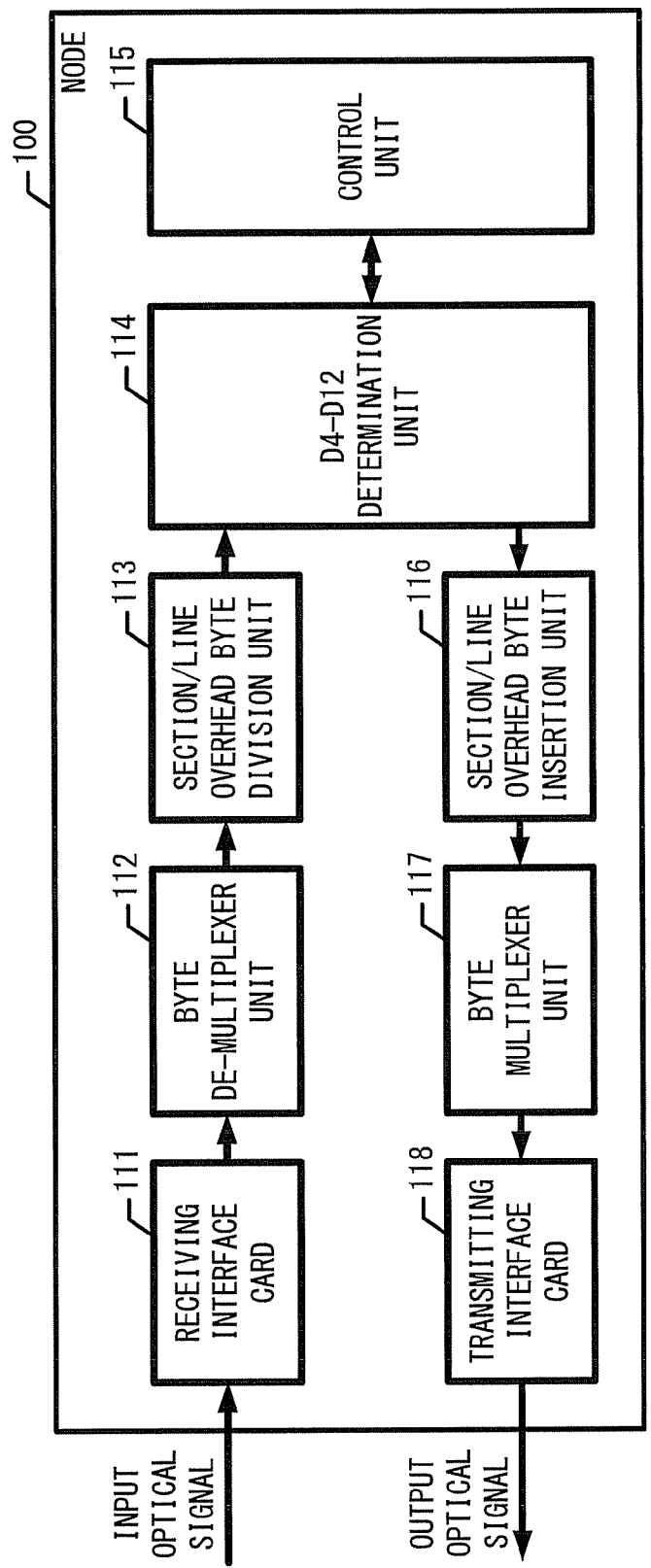
FIG. 4 is a diagram illustrating an operation for processing an optical signal performed by the node.

FIG. 4 is a diagram illustrating an operation for processing the optical signal performed by the node. The node 100 illustrated in FIG. 4 includes a receiving interface card 111, a byte de-multiplexer unit 112, a section/line overhead byte division unit 113, a D4-D12 determination unit 114, a control unit 115, a section/line overhead byte insertion unit 116, a byte multiplexer unit 117, and a transmitting interface card 118 so as to receive the optical signal transmitted from the other node, and transmit the signal to the other node.

The communication system according to the embodiment uses SONET. In the communication network using SONET, DCC byte (Data Communication Channel Byte) inside SONET-OHB (Overhead Byte) and OSI (Open System Interconnect) protocol are used for the communication between NMS (Network Management System) and the respective nodes, and between the respective nodes.

In the communication system according to the embodiment, SONET is employed for forming the communication network. However, GMPLS (Generalized Multi-Protocol Label Switching) may be employed for forming the communication network without being limited to the embodiment. In case of the GMPLS communication network, TCP/IP (Transmitting Control Protocol/Internet Protocol) is employed as the communication protocol between the NMS and the transmission device, and between the respective transmission devices. That is, the communication system may be sufficiently formed so long as the communication path of the communication network is IP over XXX (for example, IP over SONET).

In the embodiment, the OSI control signal is communicated with LAPD (Link Access Procedure, D-channel) protocol using D4-D12 regions of SDCC (Section-DCC) of the SONET-OHB (not illustrated) for controlling the communication route and the like. In the GMPLS communication network as described above, the GMPLS control signal in accordance with PPP (Point-to-Point Protocol) is communicated.

An operation for processing the received information will be described hereinafter. The receiving interface card 111 receives the optical signal from the other node such that the received optical signal is converted into the electric signal. The byte de-multiplexer unit 112 divides SONET-OHB from the electric signal converted by the receiving interface, card 111. The section/line overhead byte division unit 113 divides the OHB in the D4-D12 from the OHB divided by the byte de-multiplexer unit 112. The D4-D12 determination unit 114 determines with respect to the data of the frame in the D4-D12 after division of the OHB from the data, which is performed by the section/line overhead byte division unit 113. The data of the frame determined by the D4-D12 determination unit 114 is transferred to the control unit 115 for processing the received information transmitted from the other node.

An operation for processing the transmission information will be described. The control unit 115 transmits the transmission information to be transmitted to the other node to the D4-D12 determination unit 114. The D4-D12 determination unit 114 generates the data of the D4-D12 representative of the transmission information transmitted from the control unit 115. In the section/line overhead byte insertion unit 116, the SONET-OHB is added to the data generated by the D4-D12 determination unit 114. The byte multiplexer unit 117 subjects the data to which the OHB is added by the section/line overhead byte insertion unit 116 to multiplication by a unit of frame. The transmitting interface card 118 converts the frame multiplexed by the byte multiplexer unit 117 from the electric signal to the optical signal so as to transmit the converted optical signal to the other node.

Figure 5:
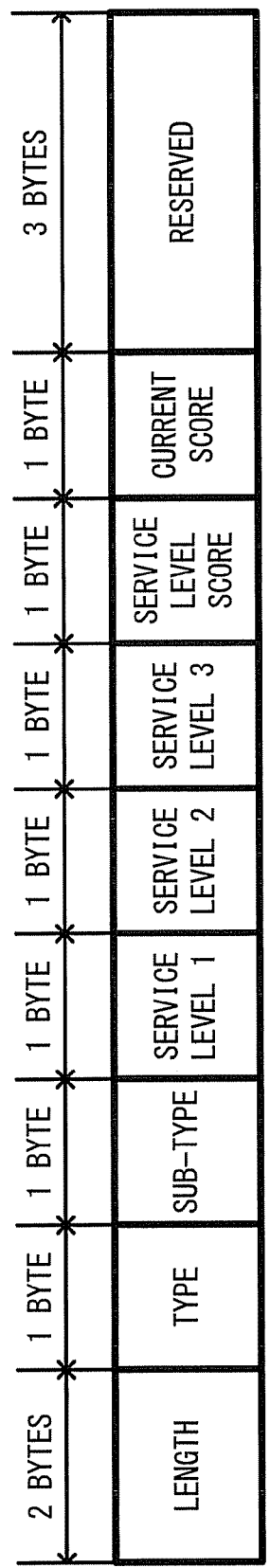
FIG. 5 is a diagram illustrating an example of a frame data structure.

FIG. 5 is a diagram illustrating an example of a frame data structure. The frame as illustrated in FIG. 5 is transmitted/received between nodes of the communication system according to the embodiment so as to notify the score set as the signaling on the communication route, the service level available for the communication route, and the request to the communication route. The aforementioned frame serves as the route connection notice.

The frame illustrated in FIG. 5 is formed of a length, a type, a sub-type, service levels 1 to 3, a service level score, a current score, and a reserved region (reserved). The frame of the embodiment is formed by adding the service levels 1 to 3, the service level score, and the current score to RSVP-TE (Resource Reservation Protocol with Traffic Engineering) protocol format so as to expand to 12 bytes.

The length denotes a region indicating the frame length. In the embodiment illustrated in FIG. 5, 2 bytes are allocated to the length. As the frame length of the example illustrated in FIG. 5 is 12 bytes, the length is set to the value of 12.

The type and sub-type denote regions each defining the frame type. Each of the type and sub-type has 1 byte allocated. In the embodiment, the type is set to 5, and the sub-type is set to 1, respectively.

Each of the service levels 1 to 3 denotes a region as the one which may be set with respect to the communication path on the communication route. Each of the service levels 1 to 3 has 1 byte allocated, respectively. In the embodiment, three regions, that is, service levels 1 to 3 are provided. However, the number of the regions for indicating the service levels may be increased or decreased in case of necessity. The service levels 1 to 3 function as the communication passage type information to be described referring to FIG. 6.

The service level score denotes the region indicating a passing point as a reference score based on which the determination with respect to pass/failure of the communication route formed of the selected communication paths. When the requirement is high, the high score is set to the service level score. When the requirement is not so severe, the low score is set. In this way, the score is set in accordance with the required level to make a determination of pass/failure with respect to the communication route based on the service level score. This makes it possible to reflect the user's request on the determination with respect to the communication route to be formed.

The current score denotes the region indicating the current score to which the score has been added upon selection of the communication path by the respective nodes. The current score has the score corresponding to the communication path selected by the node added upon each transmission of the frame by the respective nodes. The state for selecting the communication path in the respective nodes is summed as the evaluation with respect to the entire communication route. The current score has 1 byte allocated.

In the embodiment, the reserved denotes a reserved region which allows no data to be stored. The reserved has 3 bytes allocated. The data structure of the frame may be modified into various forms in accordance with the standard of the communication network, and the operation style thereof. The information other than the one illustrated in FIG. 5 may be added.

Figure 6:
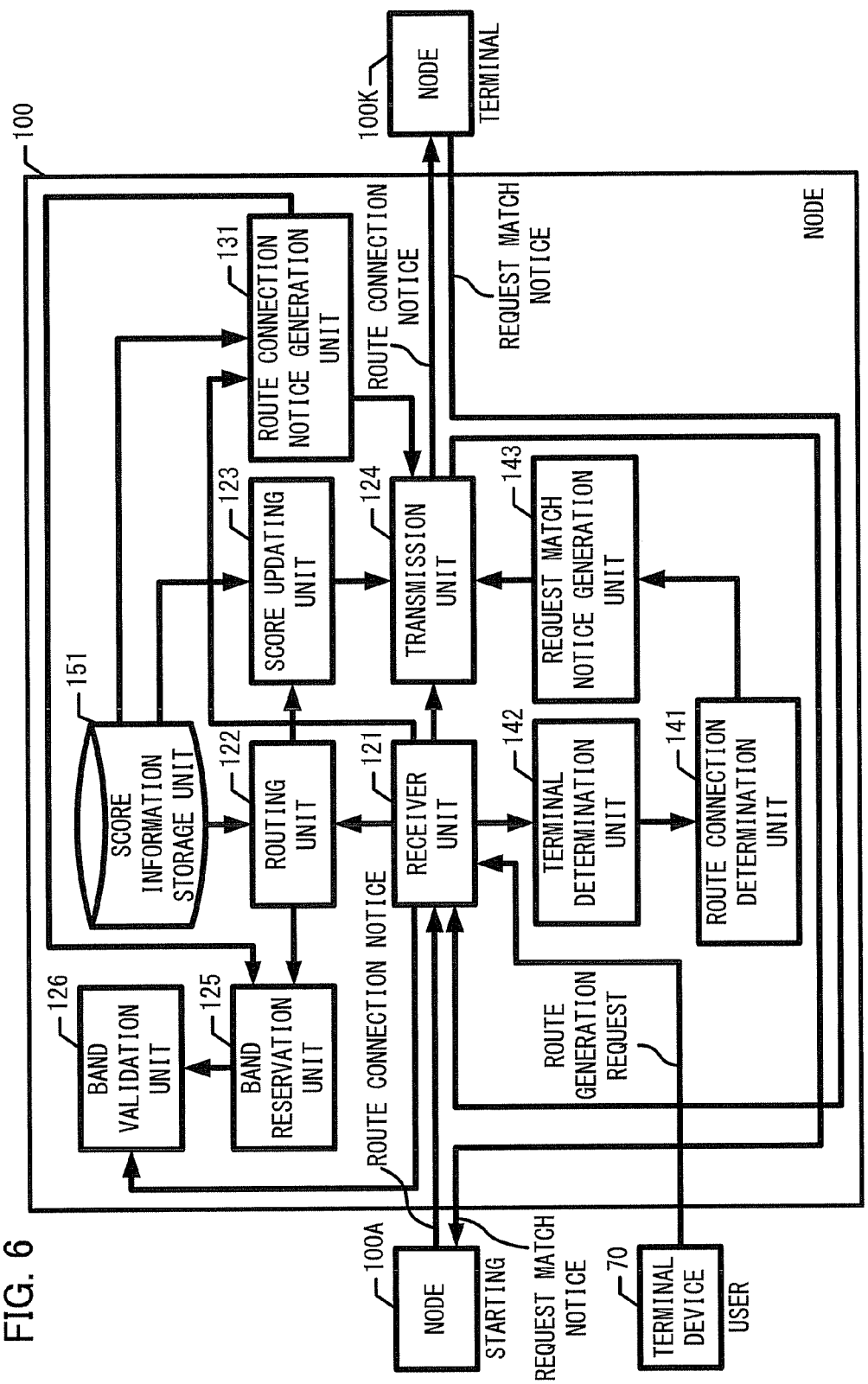
FIG. 6 is a diagram illustrating a structure of the node.

FIG. 6 is a diagram illustrating a structure of the node. The node 100 illustrated in FIG. 6 serves as the layer 2 switch which has a function for selecting the subsequent communication path in accordance with the score set to the communication path, adding the score corresponding to the selected communication path, and transmitting the score to the next node for the purpose of forming the communication route over the communication network. The node 100 is connected to a terminal device 70 used by the user, and connected to a not illustrated terminal device used by the manager for managing the communication system.

The communication route is required by the user to have the starting point to the terminal end formed on the communication system. The communication path is a physical or a logical link for connecting the adjacent nodes of the communication route on the communication system. The service level denotes the condition such as reliability available for the respective communication paths. At least one service level is set with respect to the single communication path. The communication route is divided by the unit of the communication network region such as I-NNI domain and the E-NNI domain to be formed of the specific node among those for forming the communication route as described referring to FIG. 2.

The node 100 includes a receiver unit 121, a routing unit 122, a score updating unit 123, a transmission unit 124, a band reservation unit 125, a band validation unit 126, a route connection notice generation unit 131, a route connection determination unit 141, a terminal determination unit 142, a request match notice generation unit 143 and a score information storage unit 151 for forming the communication route with the other node. The node 100 serves as a relay on the communication route starting from the node 100A as the starting node to a node 100K as the terminal node. Each of the nodes 100, 100A and 100K has the same function. Besides the node 100, a not illustrated node with the same structure as the node 100 to serve as the relay may be provided between the node 100A and the node 100K on the communication route.

The receiver unit 121 receives the route connection notice which includes the current score information transmitted from the preceding node (other node (not illustrated) for relaying or the node 100A as the starting node) on the communication route. The receiver unit 121 receives the request match notice transmitted from the communication device as the terminal on the communication route.

The route connection notice is a notice for requesting formation (connection) of the communication route to the respective nodes for forming the communication route. The route connection notice is transmitted from the node 100A as the starting node based on the request from the user who uses the terminal device 70 of the communication system for forming the communication route. The notice is generated by a not illustrated route connection notice generation unit (with the same function as that of the route connection notice generation unit 131) in the node 100A. The route connection notice is transmitted in the frame format as described in detail referring to FIG. 5.

The route connection notice includes communication path type information for defining the type of the communication path as a candidate to be selected. The available (selectable) service level for the respective communication path of the communication route may be defined by the communication path type information. The route connection notice includes the route information indicating the node which constitutes the communication route. Based on the route information, the respective nodes may be notified of the node on the communication path required to be formed by the user. The route connection notice includes the current score information to be described later, the passing point information indicating the passing point of the current score when the communication path from the starting point to the terminal end on the communication route is selected, and the service level information indicating the service level selectable by the routing unit 122.

The current score information included in the route connection notice is information which represents the current score as a value for evaluating a partial communication route as a part of the communication route to be formed of the node 100 and the other node based on the user's request, for example, and has been already selected up to the present time on the communication route from the node 100A as the starting point of the communication route. The current score information serves as the present score information.

The routing unit 122 acquires the score information stored in the score information storage unit 151. The routing unit 122 specifies the selectable communication path and the service level based on the route information and the communication path type information both included in the route connection notice. At least one service level of the communication path exists with respect to the respective communication paths as described referring to FIG. 2.

In the case where plural service levels are selectable on the next communication path, the routing unit 122 acquires each score of the selectable service levels of the communication path, and selects the communication path next to the communication path which has been already selected by the routing unit of the other node (not illustrated) on the communication route and the service level by evaluating the communication path based on the score information. The routing unit 122 makes the evaluation based on the service level information included in the route connection notice and the score information stored in the score information storage unit 151, and then selects the communication path with the highest evaluation and the service level based on the score of the score information as the service level for the communication path next to the already selected communication path on the communication route (the communication path to the node next to the node 100).

The routing unit (not illustrated) of the node 100A as the starting node, which has the same function as that of the routing unit 122 of the node 100 evaluates the communication path and the service level based on the user's request through the terminal device 70 and the score information stored in the score information storage unit (not illustrated) of the node 100A so as to select the first communication path from the starting point on the communication route.

The score updating unit 123 reads the score information stored in the score information storage unit 151. The score updating unit 123 acquires the score as the evaluated value of the communication path newly selected by the routing unit 122 based on the read score information. The score updating unit 123 then adds the score of the selected communication path which has been acquired by the routing unit 122 to the current score of the current score information included in the route connection notice received by the receiver unit 121. Then the score updating unit 123 updates the current score information by setting the added result to the current score.

The transmission unit 124 transmits the route connection notice which includes the current score updated by the score updating unit 123 to the next node on the communication route (other node (not illustrated) for relaying or the node 100K as the terminal node). The transmission unit (not illustrated) of the node 100A as the starting node has the same function as that of the transmission unit 124 of the node 100, and transmits the route connection notice generated by the route connection notice generation unit (not illustrated) with the same function as that of the route connection notice generation unit 131 of the node 100 to the next node on the communication route indicated by the route information. The transmission unit (not illustrated) of the node 100K as the terminal node has the same function as that of the transmission unit 124 of the node 100, and transmits the request match notice to the node 100A as the starting point via the communication device for forming the transmission route.

When the communication path is selected by the routing unit 122, the band reservation unit 125 reserves the band for the selected communication path.

In the case where the receiver unit 121 receives the request match notice for notifying with respect to the determination for forming the communication route by the communication device as the terminal of the communication route, the band validation unit 126 validates the band reserved by the band reservation unit 125.

In the case where the communication device is at the starting point of the communication route, the route connection notice generation unit 131 sets an initial value in the current score information, and generates the route connection notice which includes the current score information having the initialized value set.

In the case where the communication device is at the terminal end of the communication route, the route connection determination unit 141 evaluates the communication route based on the current score information included in the route connection notice received by the receiver unit 121. If the evaluation result satisfies the predetermined condition, it is determined to form the communication route. If the evaluation result fails to satisfy the predetermined condition, it is determined not to form the communication route. Specifically, if the current score obtained when selecting the communication path from the starting point to the terminal end on the communication route is equal to or higher than the passing point indicated by the passing point information, it is determined to form the communication route. If the current score is below the passing point, it is determined not to form the communication route.

When the route connection notice is received by the receiver unit 121, the terminal determination unit 142 determines whether or not the node 100 is the terminal node based on the route information included in the received route connection notice.

In the case where the node 100 is at the terminal end of the communication route required by the user, and the route connection determination unit 141 of the node 100 determines to form the communication route, the request match notice generation unit 143 generates the request match notice for notifying that the determination for forming the communication route has been made.

The score information storage unit 151 stores the score information based on which the communication path which connects the adjacent nodes on the communication route is evaluated. The score information is set by the manager of the communication system or the user who requires the communication system to form the communication route. The score information includes the score set by evaluating the item with respect to the communication paths or the service level to be focused or emphasized by the user, for example, reliability of the communication path such that the superior item is set to the high score, and the inferior item is set to the low score.

The score information represents the evaluation of the service level which defines reliability of the communication path on the communication route. The score of the score information is set such that the communication path with high reliability is highly evaluated.

The node 100 is provided as the layer 2 switch. However, it may be provided as the other type of the communication device using the data relay function such as the layer 3 switch and the router.

FIG. 7 is a diagram illustrating an exemplary structure of the score table according to the first embodiment. A score table 151A illustrated in FIG. 7 is a table which stores the score information, and is stored in the table storage memory 104 (described referring to FIG. 3) of the node 100. The score information is referred by the node 100 for selecting the next communication path, and represents the score allocated to the service level of the communication path.

The score table 151A includes such items as "service level value", "service level type" and "score". The service level value is the item which represents the value allocated for identifying the respective service levels. The service level type is the item which represents the description of each of the service levels. The service level value is set to the service level 1 to service level 3 in the frame as described referring to FIG. 5. The score is allocated to each of the respective service levels. When the next communication path and the service level on the communication route are selected by the respective nodes, the score in accordance with the selection is added to the current score of the frame as described referring to FIG. 5.

The user who requires the communication system (described referring to FIG. 2) according to the embodiment to form the communication route sets the required passing point with respect to the communication route based on the service level available on the communication path in each of the I-NNI domains, and the score information stored in the score table 151A. The score is added in accordance with the service level selected by each node on the communication route formed by the communication system. The final sum total value of the score is compared with the passing point so as to determine whether or not the communication route is to be formed.

In the embodiment, the aforementioned service levels may be used on the communication path of the communication system. However, the service level other than the one as described above, for example, Restoration type, and Reversion strategy may be made available. The following and other service levels may be available, which include PCA (Protection Channel Access) (BLSR) which uses the spare channel, Protection Dedicated which prepares spare channel with band, Shared protection which shares spare channel, Fast Reroute which reroutes for a short period, Reroute which reroutes with no time guarantee, Link Disjoint protection which is protection without sharing the link, Node Disjoint protection which is protection without sharing the node, SRLG Disjoint protection which is protection without sharing SRLG (Shared Risk Link Group), Co-route VCAT/LCAS LINK in which VCAT/LCAS (Virtual Concatenation/Link Capacity Adjustment Scheme) passes through the same link), and Co-route VCAT/LCAS NODE in which VCAT/LCAS passes through the same node).

In the case where the aforementioned service level is made available for the communication path of the communication system, the available service level, the service level value and the score corresponding to the service level are set in the score table 151A. The score corresponding to the available service level is calculated to allow determination whether or not the communication route is formed at the terminal node.

An operation to be executed in the embodiment will be described.

Figure 8:
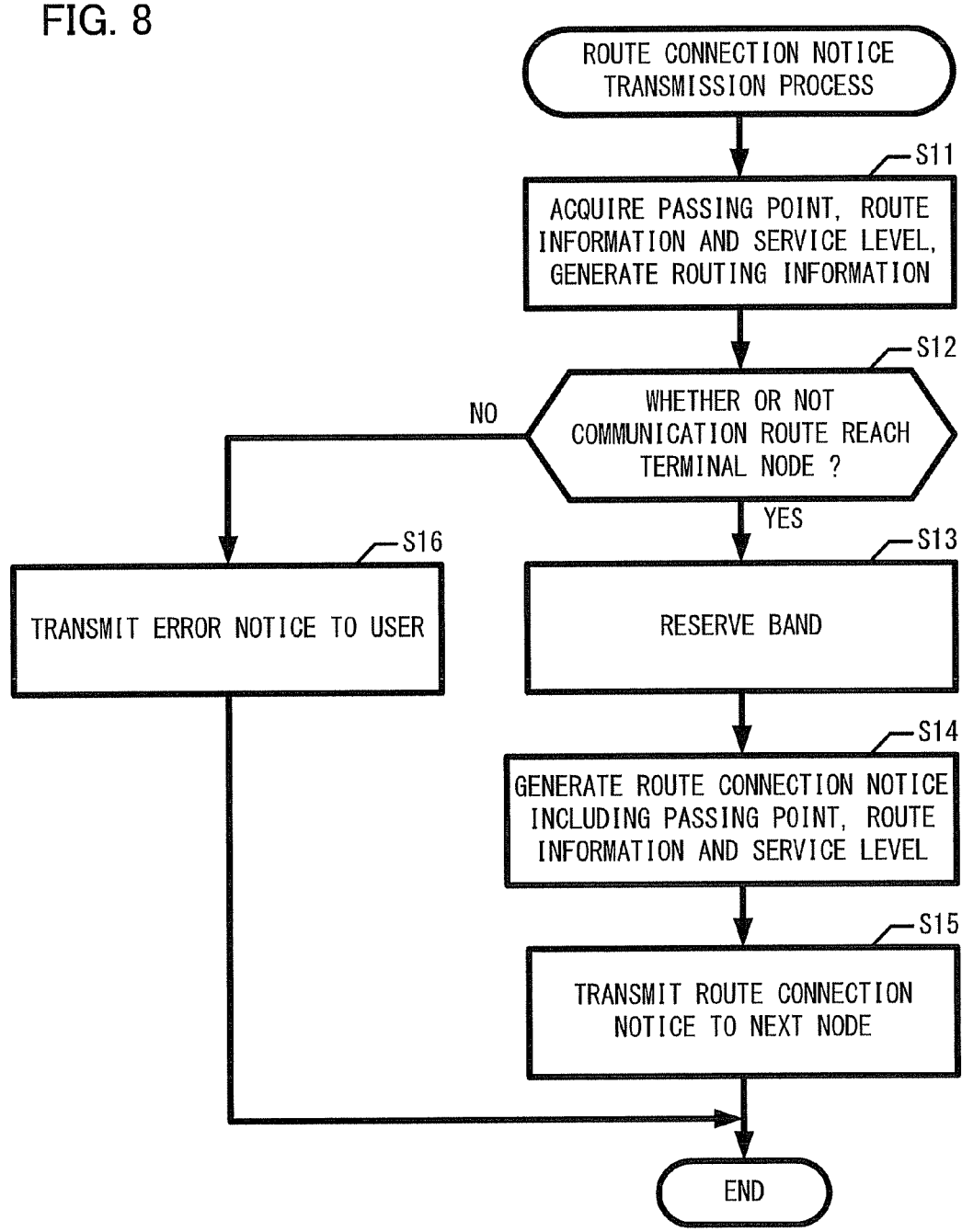
FIG. 8 is a flowchart illustrating a routine of a route connection notice transmission process.

FIG. 8 is a flowchart illustrating the routine of the route connection notice transmission process. The route connection notice transmission process is the process to transmit the route connection notice, is executed to generate the route connection notice which includes the route information, the passing point and the service level when the node 100 is the starting node on the communication route required by the user, and to start signaling by transmitting the generated route connection notice to the next node. The route connection notice transmission process is executed when the node 100 as the starting node receives the route generation request transmitted from the terminal device (for example, the terminal device 70 described referring to FIG. 6) used by the user to start setting the communication route.

Step S11: The route connection notice generation unit 131 acquires the passing point, route information, and at least one set service level included in the route generation request transmitted from the terminal device used by the user, and generates the routing information in accordance with the route information.

Step S12: Based on the routing information generated in step S11, the route connection notice generation unit 131 determines whether or not the communication route required by the user, which is represented by the user's route generation request is enabled to reach the terminal node from the starting node, that is, the connection from the starting node to the terminal node may be established by the communication path and the relaying node. If it is determined that the communication route is enabled to reach, the process proceeds to step S13. Meanwhile, if it is determined that the communication route is unable to reach, the process proceeds to step S16.

Step S13: In accordance with the route information, the band reservation unit 125 reserves the band for which the communication path is formed to connect the node 100 as the subject node to the next node. At this time, in the case where there are plural communication paths and the service levels from the subject node to the next node, the communication path with the highest score and the service level are selected, and the band corresponding to the selected communication path and the service level is reserved.

Step S14: Based on the information acquired in step S11, the route connection notice generation unit 131 generates the route connection notice which includes the passing point, the route information and the service level.

Step S15: The transmission unit 124 transmits the route connection notice generated by the route connection notice generation unit 131 in step S14 to the next node based on the route information. Thereafter, the route connection notice transmission process ends.

Step S16: The transmission unit 124 transmits an error notice about the failure to reach the communication route required by the user to the terminal device used by the user. The user is notified that the required level fails to form the communication route from the starting node to the terminal node. Thereafter, the route connection notice transmission process ends.

Figure 9:
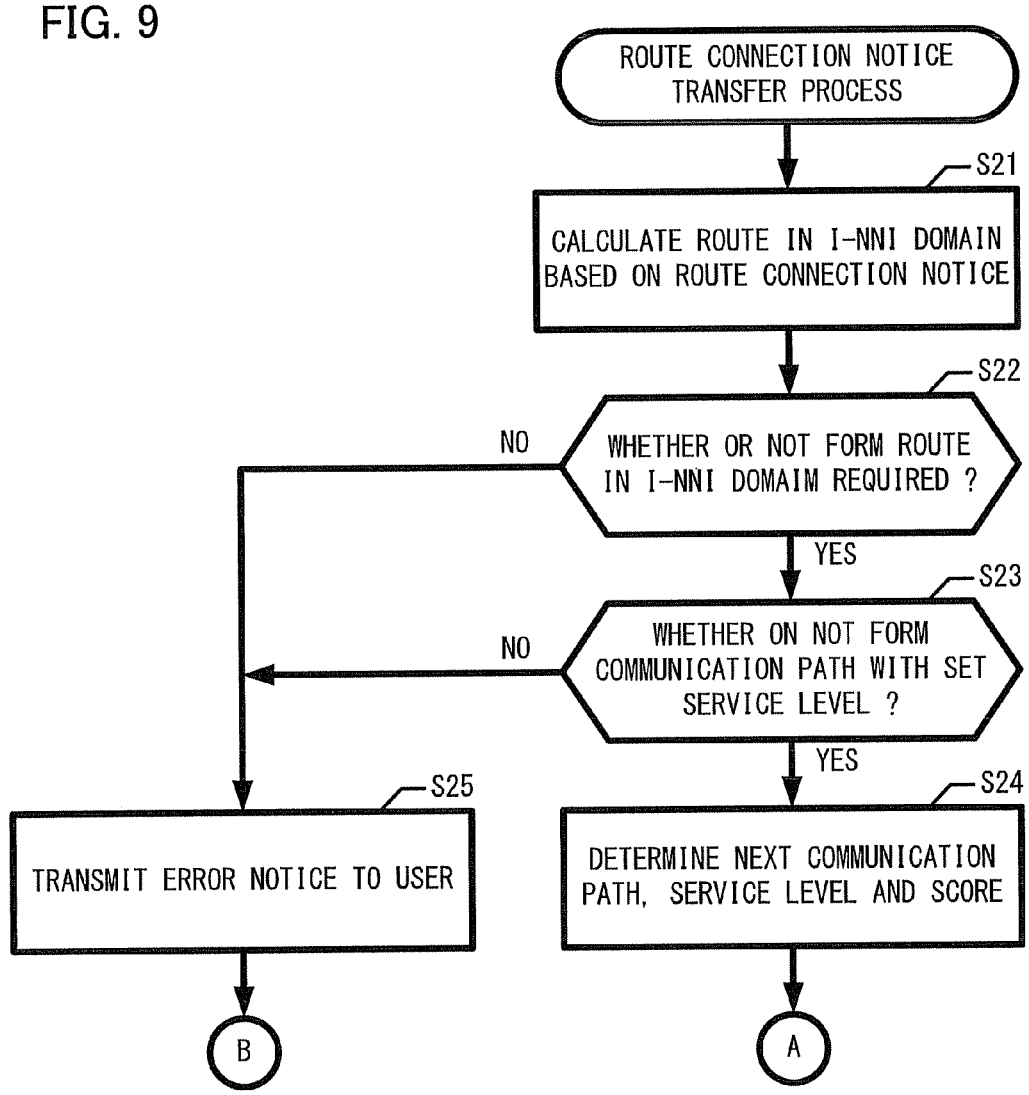
FIG. 9 is a flowchart illustrating a routine of a route connection notice transfer process.
Figure 10:
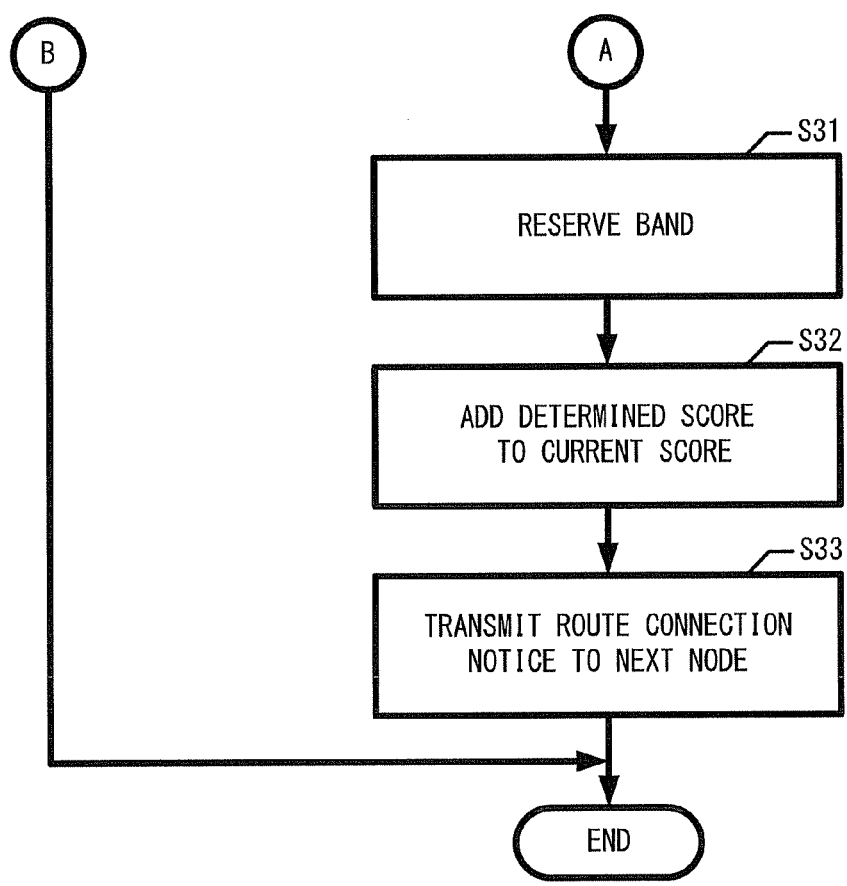
FIG. 10 is a flowchart illustrating a routine of a route connection notice transfer process.

FIGS. 9 and 10 are flowcharts illustrating the routine of the route connection notice transfer process. In the case where the node 100 is the relay node on the communication route required by the user, the node 100 receives the route connection notice which contains the route information, the passing point, and the service level transmitted from the preceding node on the communication route, and the route connection notice transfer process newly sets the communication path in accordance with the received route connection notice. The set score on the communication path is added to the score of the route connection notice, and the route connection notice is further transferred to the next node. The route connection notice transfer process is executed by the node 100 as the relaying node based on reception of the route generation request transmitted from the preceding node by the receiver unit 121.

The determination whether the node 100 which receives the route connection notice is the relay node or the terminal node may be made by the terminal determination unit 142 based on the route information included in the route connection notice transmitted from the preceding node on the communication route required by the user and received by the receiver unit 121.

Step S21: The routing unit 122 calculates the score of the route in the I-NNI domain to which the node 100 as the subject node belongs based on the route connection notice transmitted from the preceding node on the communication route required by the user and received by the receiver unit 121. The node 100 is communicated with the other node in the I-NNI domain to which the node 100 belongs so as to acquire the route information in the I-NNI domain from the other node. The optimum route in the I-NNI domain may be obtained based on the acquired route information.

Step S22: The routing unit 122 determines whether or not it is possible to form the route in the I-NNI domain to which the node 100 belongs on the communication route required by the user in reference to the route calculation result in step S21. If it is possible to form the route, the process proceeds to step S23. Meanwhile, if it is impossible to form the route, the process proceeds to step S25.

Step S23: The routing unit 122 determines whether or not at least one service level set in the route connection notice allows formation of the communication path in the I-NNI domain to which the node 100 belongs. If it is possible to form the communication path, the process proceeds to step S24. Meanwhile, if it is impossible to form the communication path, the process proceeds to step S25.

Step S24: The routing unit 122 determines the next communication path, the service level, and the score thereof. The routing unit 122 refers to the score table 151A as described referring to FIG. 7 to select the service level with the highest score among those available on the communication path in the I-NNI domain to which the node 100 belongs, and set in the route connection notice to be selectable. The score corresponding to the selected service level among those stored in the score table 151A is set as the determined score. Thereafter, the process proceeds to step S31 (to be described referring to FIG. 10).

Step S25: The routing unit 122 transmits an error notice that the communication path in the I-NNI domain to which the node 100 belongs on the communication route required by the user is not formed based on the determination result in step S22, or that the communication path in the I-NNI domain to which the node 100 belongs on the communication route required by the user at the service level set in the route connection notice is not formed based on the determination result in step S23 to the terminal device used by the user. The user is notified that the required communication route is not formed in the I-NNI domain to which the node 100 belongs. Thereafter, the route connection notice transfer process ends.

Step S31: The band reservation unit 125 reserves the band at which the communication path for connecting the node 100 as the subject node to the next node is formed based on the determination made by the routing unit 122 in step S24.

Step S32: The score updating unit 123 adds the score determined by the routing unit 122 in step S24 to the current score included in the route connection notice received by the receiver unit 121.

Step S33: The transmission unit 124 transmits the route connection notice having the score added in step S32 to the next node on the communication route required by the user based on the route information included in the route connection notice. The route connection notice is then transferred to the next node on the communication route required by the user. Thereafter, the route connection notice transfer process ends.

Figure 11:
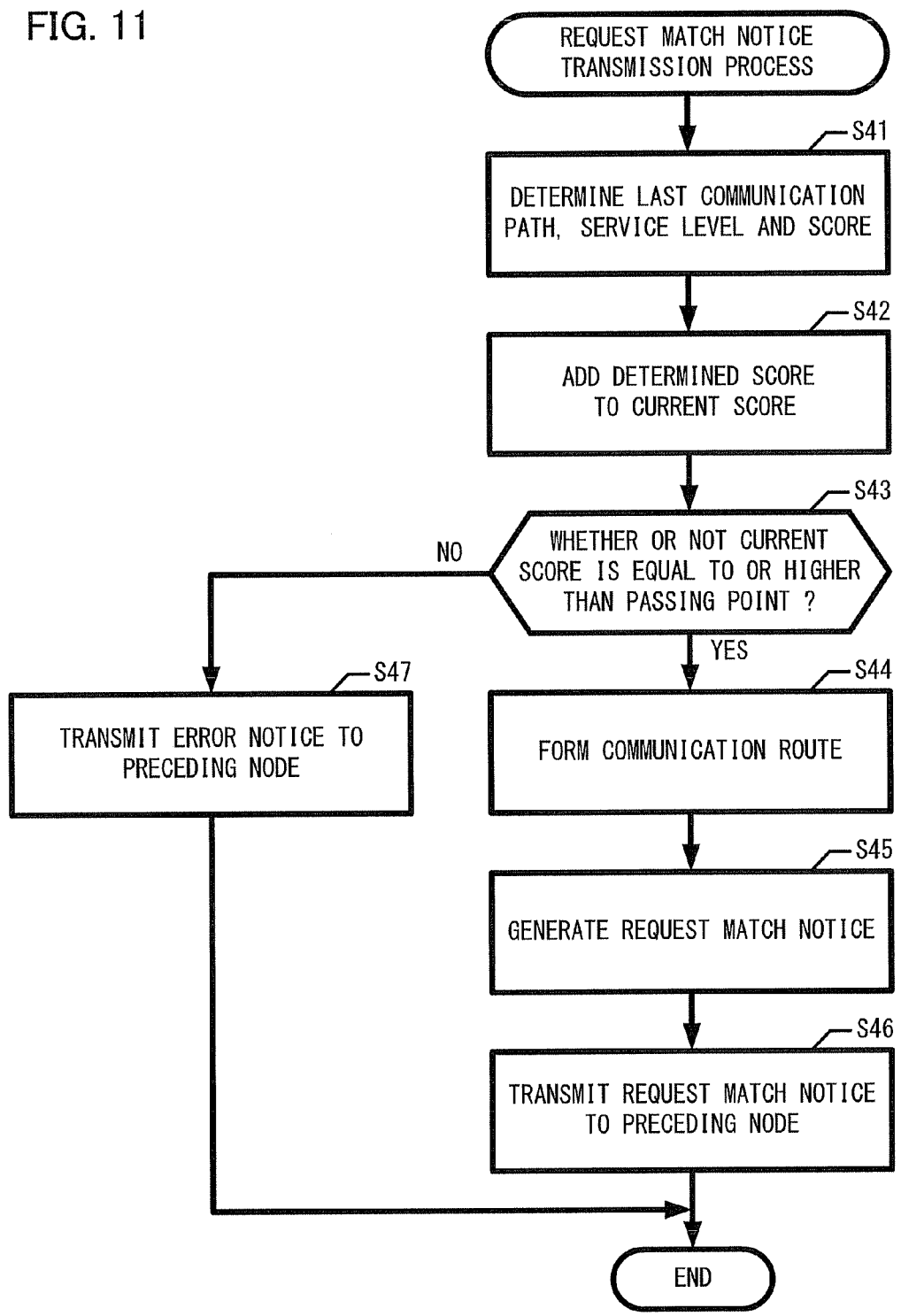
FIG. 11 is a flowchart illustrating a routine of a request match notice transmission process.

FIG. 11 is a flowchart illustrating the routine of the request match notice transmission process. In the case where the node 100 is the terminal node on the communication route required by the user, the node 100 receives the route connection notice transmitted from the preceding node on the communication route, and the request match notice transmission process sets the last communication path on the communication route in accordance with the received route connection notice. The request match notice transmission process adds the set communication path score to the score of the route connection notice to determine whether or not it is possible to form the communication route. The process further generates the request match notice for notifying the other node of formation of the communication route and transmits the generated request match notice. The request match notice transmission process is executed by the node 100 as the terminal node based on reception of the route generation request transmitted from the preceding node by the receiver unit 121.

As described above, the determination whether the node 100 which has received the route connection notice is the relay node or the terminal node may be made by the terminal determination unit 142 based on the route information included in the route connection notice transmitted from the preceding node on the communication route required by the user and received by the receiver unit 121.

Step S41: The routing unit 122 determines the last communication path on the communication route (that is, the communication path for connecting the preceding node to the node 100 as the terminal node), the service level, and the score thereof. The routing unit 122 refers to the score table 151A as described referring to FIG. 7 to select the service level with the highest score among those available on the communication path and set in the route connection notice to be selectable. The score corresponding to the selected service level among those stored in the score table 151A is set to the determined score.

Step 542: The score updating unit 123 adds the score determined by the routing unit 122 in step S41 to the current score included in the route connection notice received by the receiver unit 121. The sum total value of the score of all the communication paths on the communication route required by the user may be calculated.

Step S43: The route connection determination unit 141 determines whether or not the current score having the score of the last communication path added in step S41 is equal to or higher than the passing point included in the route connection notice. If the current score is equal to or higher than the passing point, the process proceeds to step 544. Meanwhile, if the current score is below the passing point, the process proceeds to step S47.

Step S44: The route connection determination unit 141 forms the communication route required by the user based on the determination result obtained in step 543.

Step S45: The request match notice generation unit 143 generates the request match notice for notifying that the communication route required by the user has been formed based on the determination result in step S43.

Step S46: The transmission unit 124 transmits the request match notice generated by the request match notice generation unit 143 in step S45 to the preceding node on the communication route required by the user. As a result, the notice that the communication route required by the user has been formed is transmitted to the other node for forming the communication route and the terminal device used by the user. Thereafter, the request match notice transmission process ends.

Step S47: Based on the result of determination in step S43, the route connection determination unit 141 transmits the error notice that the sum total of the score of the communication route required by the user is below the passing point to the preceding node based on the route information included in the route connection notice. The notice that the sum total of the score of the communication route required by the user fails to reach the passing point, and the communication route required by the user will not be formed is transmitted to the other node, and to the terminal device used by the user via the other node. Thereafter, the request match notice transmission process ends.

Figure 12:
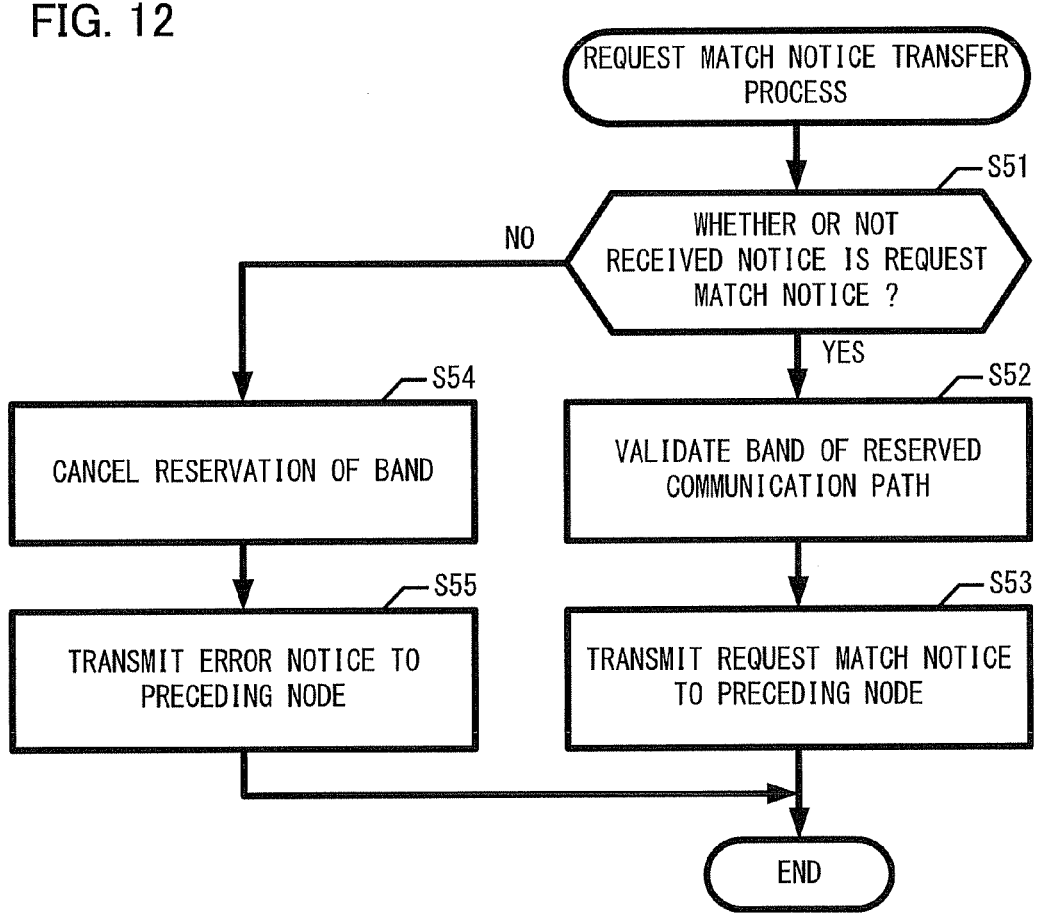
FIG. 12 is a flowchart illustrating a routine of a request match notice transfer process.

FIG. 12 is a flowchart illustrating the routine of the request match notice transfer process. In the case where the node 100 is the relay node on the communication route required by the user, when the request match notice transmitted from the next node (including the terminal node) on the communication route is received, the request match notice transfer process validates the band of the communication path reserved in accordance with the received request match notice, and transfers the request match notice to the preceding node. When the error notice transmitted from the next node on the communication route is received, the request match notice transfer process is executed based on the request match notice transmitted from the next node on the communication route required by the user or reception of the error notice by the receiver unit 121 in the node 100 as the relay node.

Based on the route information included in the corresponding route connection notice received by the receiver unit 121, the determination is made by the band validation unit 126 (described referring to FIG. 6) whether the node 100 which has received the request match notice or the error notice is the relay node or the starting node.

Step S51: The band validation unit 126 determines whether the notice received by the receiver unit 121 is the request match notice or the error notice. If it is determined as the request match notice, the process proceeds to step S52. Meanwhile, if it is determined as the error notice, the process proceeds to step S54.

Step S52: Based on the determination result in step S51, the band validation unit 126 validates the corresponding band of the communication path for connecting the node 100 as the subject node to the next node, reserved in step S31 (described referring to FIG. 10) of the route connection notice transfer process.

Step S53: The transmission unit 124 transmits the request match notice received by the receiver unit 121 to the preceding node on the communication route required by the user. The notice that the communication route required by the user has been formed is sent to the other node for forming the communication route, and the terminal device used by the user. Thereafter, the request match notice transfer process ends.

Step S54: The band validation unit 126 cancels reservation of the corresponding band on the communication path for connecting the node 100 as the subject node to the next node, reserved in step S31 of the route connection notice transfer process, based on the determination result in step S51.

Step S55: The transmission unit 124 transmits the error notice received by the receiver unit 121 to the preceding node on the communication route required by the user. The notice that the communication route required by the user will not be formed is sent to the other node and the terminal device used by the user. Thereafter, the request match notice transfer process ends.

Figure 13:
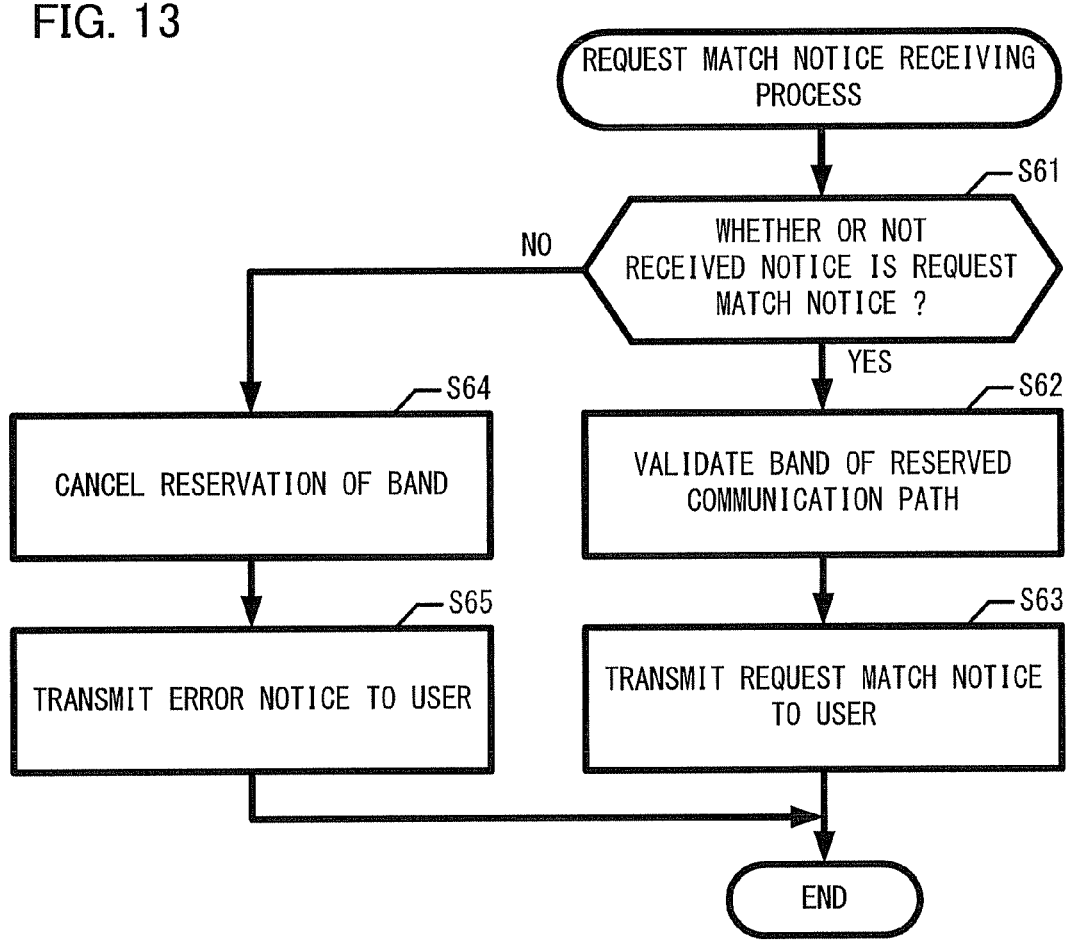
FIG. 13 is a flowchart illustrating a routine of a request match notice receiving process.

FIG. 13 is a flowchart illustrating the routine of the request match notice receiving process. In the case where the node 100 is the starting node on the communication route required by the user, the request match notice receiving process is executed upon reception of the request match notice transmitted from the next node (including the terminal node) on the communication route so as to validate the band of the communication path reserved in accordance with the received request match notice, and to transmit the request match notice to the terminal device used by the user. In the case where the error notice transmitted from the next node on the communication route is received, the request match notice receiving process is executed to cancel the reservation of the corresponding band, and to transfer the error notice to the terminal device (for example, the terminal device 70 illustrated in FIG. 6) used by the user. The request match notice receiving process is executed by the node 100 as the starting node based on the request match notice or the error notice transmitted from the next node received by the receiver unit 121 on the communication route required by the user.

As described above, the determination whether the node 100 which has received the request match notice or the error notice is the relay node or the starting node may be made by the band validation unit 126 based on the route information included in the corresponding route connection notice received by the receiver unit 121.

Step S61: The band validation unit 126 determines whether the notice received by the receiver unit 121 is the request match notice or the error notice. If it is determined as the request match notice, the process proceeds to step S62. If it is determined as the error notice, the process proceeds to step S64.

Step S62: Based on the determination result in step S61, the band validation unit 126 validates the corresponding band of the communication path for connecting the node 100 as the subject node to the next node, reserved in step S13 (described referring to FIG. 8) of the route connection notice transmission process.

Step S63: The transmission unit 124 transmits the request match notice received by the receiver unit 121 to the terminal device used by the user. This allows the notice that the communication route required by the user has been formed to be sent to the terminal device used by the user. Thereafter, the request match notice receiving process ends.

Step S64: Based on the determination result in step S61, the band validation unit 126 cancels the reservation of the corresponding band of the communication path for connecting the node 100 as the subject node to the next node, reserved in step S13 (described referring to FIG. 8) of the route connection notice transmission process.

Step S65: The transmission unit 124 transmits the error notice received by the receiver unit 121 to the terminal device used by the user. This allows the notice that the communication route required by the user will not be formed to be sent to the terminal device used by the user. Thereafter, the request match notice receiving process ends.

Figure 14:
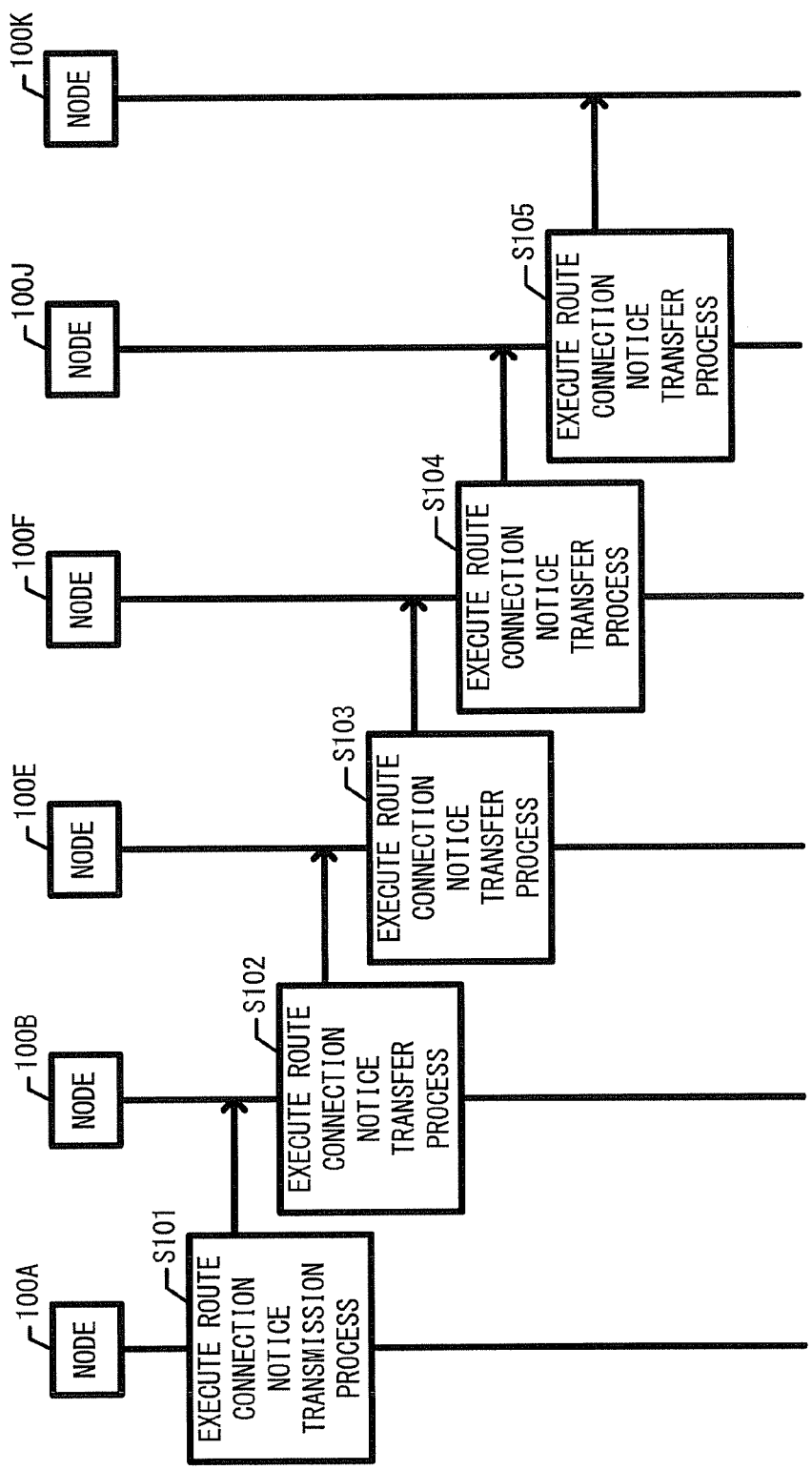
FIG. 14 is a sequence chart illustrating a routine for forming a communication route.
Figure 15:
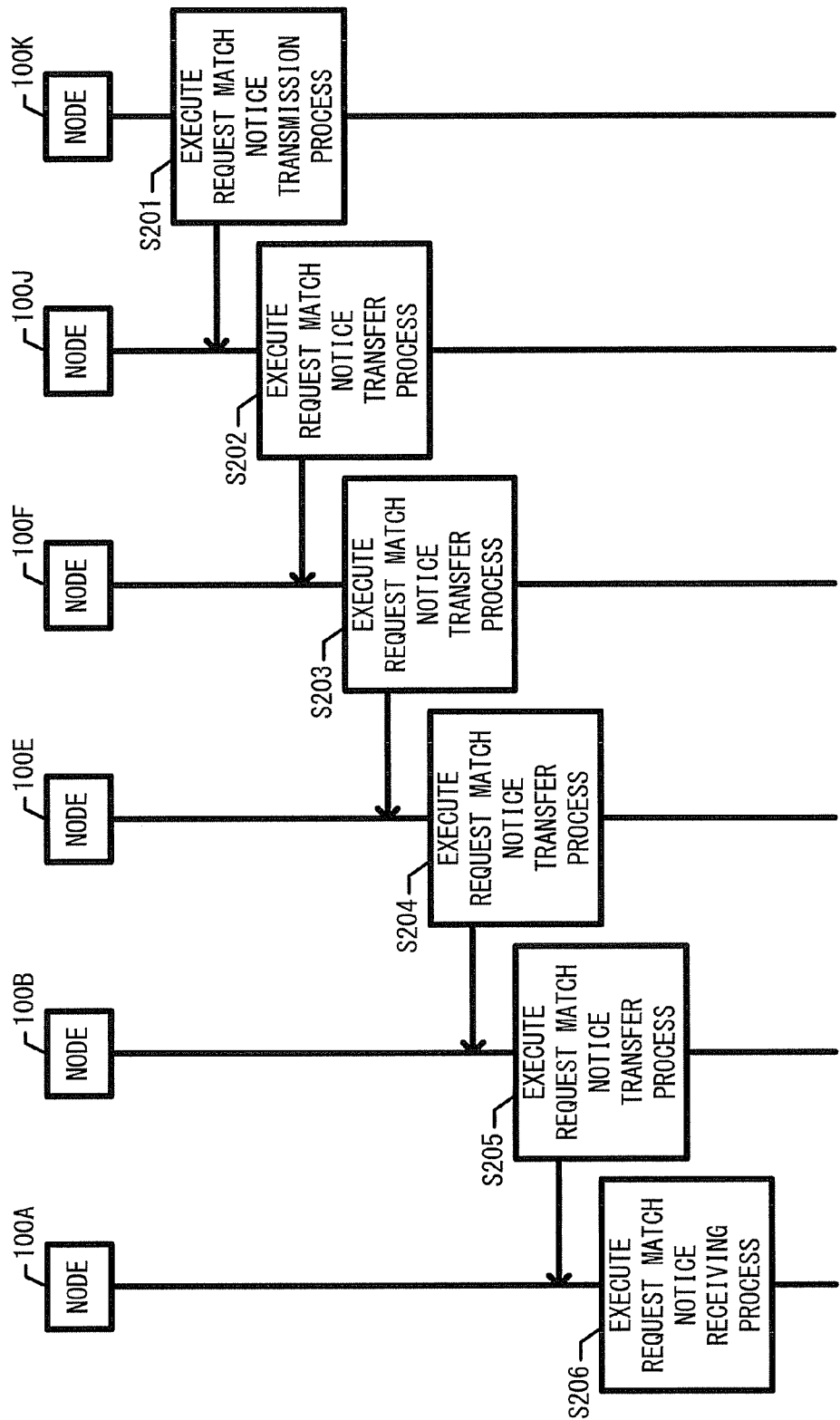
FIG. 15 is a sequence chart illustrating the routine for forming the communication route.

FIGS. 14 and 15 are sequence charts each illustrating the routine for forming the communication route. As described referring to FIG. 2, the starting node is designated as the node 100A, the relay nodes for relaying are designated as the nodes 100B, 100C, 100D, 100E, 100F, 100G, 100H and 100J, and the terminal node is designated as the node 100K. Those nodes are assumed to belong to different E-NNI domains (E-NNI domains 41, 42, 43). The E-NNI domain 42 is formed of plural I-NNI domains (I-NNI domains 51, 52). The nodes 100B to 100E, and the nodes 100F to 100J belong to different I-NNI domains (the I-NNI domains 51, 52). The domain contact nodes as the nodes for connecting different domains as the relay nodes are designated as 100B, 100E, 100F and 100J.

The terminal device used by the user sends the request for forming the communication route having the starting node set to the node 100A and the terminal node set to the node 100K, and the node 100A as the starting node of the communication route required by the user receives the route information, the passing point, and the selectable service level of the communication route required to be set so as to start executing the best effort signaling for forming the communication route at the service level as high as achievable. The route information of the communication route required by the user represents the node 100A as the starting node, the node 100K as the terminal node, and the nodes 1008, 100E, 100F and 100J as the domain contact nodes on the route from the starting node to the terminal node.

The routine of the best effort signaling process executed by the respective nodes upon setting of the communication route will be described referring to FIGS. 14 and 15.

Step S101: The node 100A as the starting node on the communication route required to be set by the user executes the route connection notice transmission process (described referring to FIG. 8) to set the communication route by generating the routing information and having the node 100A set to the starting node, and the node 100K set to the terminal node via the nodes 100B, 100E, 100F and 100J, and further to transmit the route connection notice which includes the passing point, the route information, and the selectable service level to the node 100B in accordance with the route information.

Step S102: The node 100B which has received the route connection notice transmitted from the node 100A executes the route connection notice transfer process (described referring to FIGS. 9 and 10), and based on the received route connection notice, selects the selectable service level with the highest score indicated by the route connection notice for reserving the band. The node 100B adds the score of the service level selected to the current score in the route connection notice through the route connection notice transfer process so as to transmit the route connection notice to the node 100E as the next node in the I-NNI domain 51 to which the node 100B belongs based on the route information.

Step S103: Likewise the node 100B, the node 100E which has received the route connection notice transmitted from the node 100B executes the route connection notice transfer process to select the service level, and to reserve the band. It further adds the score of the selected service level to the current score of the route connection notice to be transmitted to the node 100F as the next node in accordance with the route information, which belongs to the I-NNI domain 52 as the next I-NNI domain.

Step S104: Likewise the node 100B, the node 100F which has received the route connection notice transmitted from the node 100E executes the route connection notice transfer process to select the service level, and to reserve the band. It further adds the score of the selected service level to the current score of the route connection notice to be transmitted to the node 100J as the next node in accordance with the route information, which belongs to the I-NNI domain 52 as the same I-NNI domain.

Step S105: Likewise the node 100B, the node 100J which has received the route connection notice transmitted from the node 100F executes the route connection notice transfer process to select the service level and, to reserve the band. It further adds the score of the selected service level to the current score of the route connection notice to be transmitted to the node 100K both as the next and terminal node in accordance with the route information.

Step S201: The node 100K as the terminal node which has received the route connection notice transmitted from the node 100J executes the request match notice transmission process (described referring to FIG. 11). It further selects the service level and adds the score of the selected service level to the current score of the route connection notice. When the current score after the addition is equal to or higher than the passing point, the communication route required by the user is formed, and the request match notice is generated and transmitted to the node 100J as the preceding node in accordance with the route information.

Step S202: The node 100J which has received the request match notice transmitted from the node 100K executes the request match notice transfer process (described referring to FIG. 12) for validating the band reserved in the route connection notice transfer process based on the received request match notice, and transmitting the request match notice to the node 100F as the preceding node in the I-NNI domain 52 to which the node 100J belongs based on the route information.

Step S203: Likewise the node 100J, the node 100F which has received the request match notice transmitted from the node 100J executes the request match notice transfer process for validating the reserved band based on the received request match notice, and transmitting the request match notice to the node 100E which belongs to the I-NNI domain 51 as the preceding node different from the node 100F based on the route information.

Step S204: Likewise the node 100J, the node 100E which has received the request match notice transmitted from the node 100F executes the request match notice transfer process for validating the reserved band based on the received request match notice, and transmitting the request match notice to the node 100B as the preceding node which belongs to the I-NNI domain 51 to which the node 100E belongs.

Step S205: Likewise the node 100J, the node 100B which has received the request match notice transmitted from the node 100E executes the request match notice transfer process for validating the reserved band based on the received request match notice, and transmitting the request match notice to the node 100A both as the preceding node and the starting node based on the route information.

Step S206: Upon reception of the request match notice transmitted from the node 100B, the node 100A as the starting node executes the request match notice receiving process (described referring to FIG. 13) for validating the reserved band based on the received request match notice, and transmitting the request match notice to the terminal device used by the user. The user receives the notice that the formation of the communication route has been completed.

In the embodiment, the communication system may fail to form the communication route in the following cases:

First case: when the user requires formation of the communication route, which is topologically impossible;

Second case: when the user requires to include the section which is not allowed to be connected at the designated service level; and Third case: when the user sets the passing point which is unnecessarily too high to support.

In those cases, the terminal device of the manager of the communication system is allowed to execute the following process:

In the first case, the user is required to request the connection again by re-confirming the route information with respect to the control plane, and connection state of the communication path in the E-NNI domain and the communication path;

In the second case, the user is required to request the connection again by re-confirming the service level which is capable of supporting the communication paths in the respective I-NNI domain and the E-NNI domain;

In the third case, the user is required to request the connection again by re-confirming the numbers of the communication paths and the respective service levels of the I-NNI domain and the E-NNI domain in the required communication route, and the score of the score information, and setting the total point again; and In the third case, the user may be required to lower the passing point or to set the score of the service level of the score information through re-examination.

In the first embodiment as described above, the point system is employed for evaluating the service level for each section of the communication route to set the plural service level types and the scores of the levels, and the passing point as the determination reference point in accordance with the object and the required level. The control plane is used to notify the set information to establish the flexible condition for setting the route. This makes it possible to realize the route setting at the better service level as high as achievable in the communication route.

Second Embodiment

A second embodiment will be described. The difference between the first and the second embodiments will be mainly described. The same components will be designated as the same codes, and explanations thereof, thus will be omitted.

The redundancy of the service level selectable on the communication path for connecting the respective nodes of the communication system according to the second embodiment is generally set to be higher than the case of the service level of the communication system according to the first embodiment (described referring to FIG. 2). Another difference between the first and the second embodiments is that the second embodiment is structured to evaluate the redundancy of the service level higher than the case of the score table 151A (described referring to FIG. 7) according to the first embodiment.

The present example will be described hereinafter.

Figure 16:
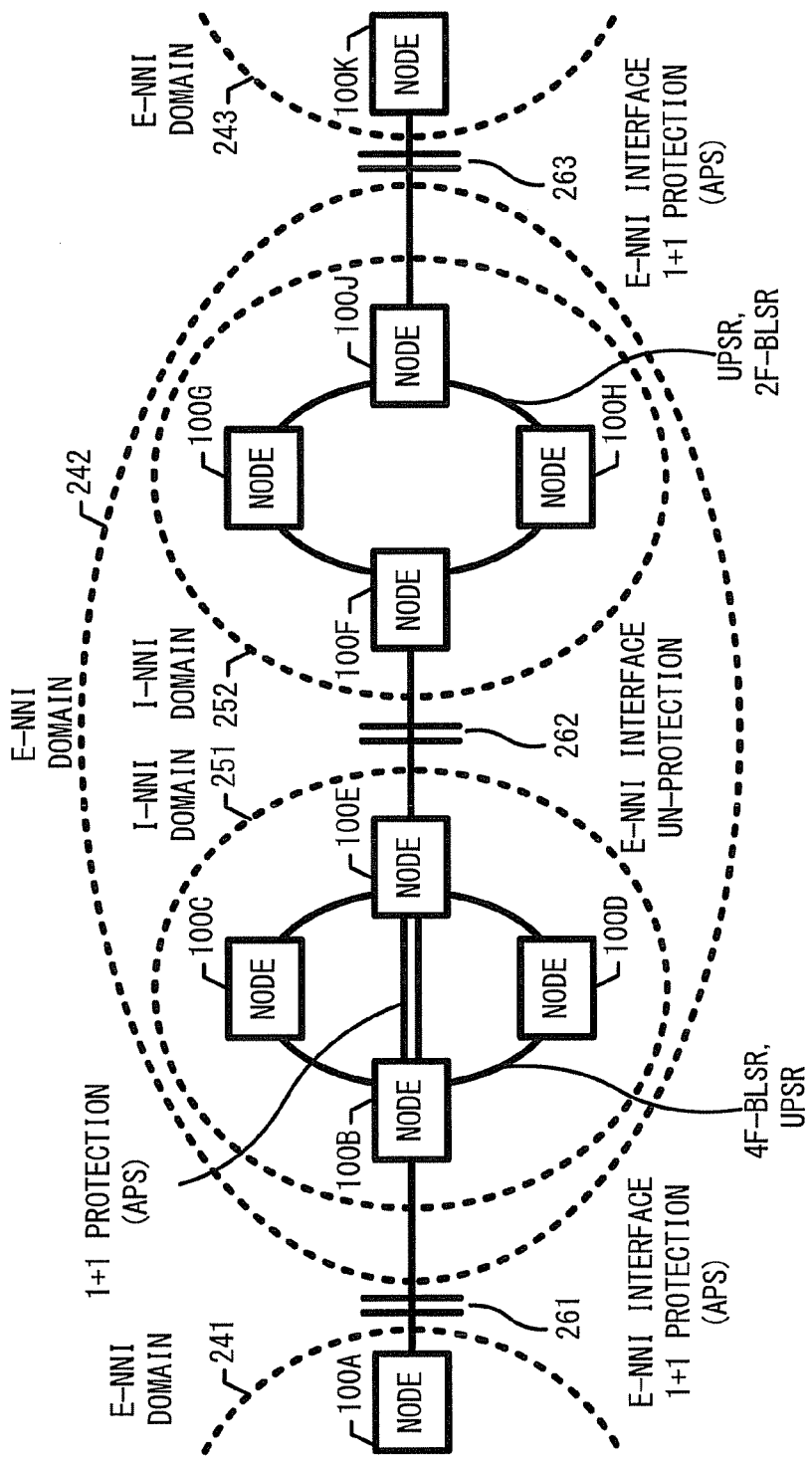
FIG. 16 is a diagram illustrating a general structure of a communication system according to a second embodiment.

FIG. 16 is a diagram illustrating the general structure of the communication system according to the second embodiment. Likewise the first embodiment, the communication system of the present embodiment is an optical transmission network where plural nodes transfer data in the frame format so as to transmit/receive the data between the terminal devices used by the user, which are connected to the communication route. Likewise the first embodiment, the communication system illustrated in FIG. 16 is formed of the nodes 100A, 100B, 100C, 100D, 100E, 100F, 100G, 100H, 100J and 100K. Each of the nodes 100A to 100K is the layer 2 switch for the optical transmission.

A not illustrated terminal device used by the user is connected to the respective nodes. The respective nodes are connected to the not illustrated terminal device used by the manager of the communication system for maintaining the communication system through the NMS. The terminal device of the manager is connected to the respective nodes so as to be maintained and managed. The respective nodes are connected with at least one physical link (for example, SONET/SDH). At least one physical link or the logical link is used for connecting the respective nodes and the terminal device of the manager. Each of the respective nodes has the same structure and the same function.

Likewise the first embodiment, each of those nodes belongs to the I-NNI domain of the control plane formed of the plural nodes. The nodes 100B, 100C, 100D and 100E belong to the I-NNI domain which is different from the one to which the nodes 100F, 100G, 100H and 100J belong. Specifically, the nodes 100B, 100C, 100D and 100E belong to the I-NNI domain 251, and the nodes 100F, 100G, 100H and 100J belong to the I-NNI domain 252.

The I-NNI domain 251 may be set to support the 4F-BLSR, UPSR, 1+1 protection (APS) as the service level. The I-NNI domain 252 may be set to support the UPSR and 2F-BLSR as the service level.

The respective I-NNI domains belong to the E-NNI domain which is formed of at least one I-NNI domain. The respective nodes belong to different E-NNI domains (E-NNI domains 241, 242, 243). For example, the I-NNI domains 251, 252 belong to the E-NNI domain 242. The node 100A is connected to the other node (not illustrated), and belongs to the not illustrated I-NNI domain and the E-NNI domain 241 as well. Likewise, the node 100K is connected to the other node (not illustrated), and belongs to the not illustrated I-NNI domain and the E-NNI domain 243 as well.

Those I-NNI domains are connected via E-NNI interfaces. For example, an E-NNI interface 261 is employed for connecting the I-NNI domain including the node 100A and the I-NNI domain 251. Likewise, an E-NNI interface 262 is employed for connecting the I-NNI domains 251 and 252. An E-NNI interface 263 is employed for connecting the I-NNI domain including the node 100K and the I-NNI domain 252. The E-NNI interfaces 261, 263 are employed for connecting the nodes at both ends with the 1+1 protection (APS). With the E-NNI interface 262, the nodes at both ends are connected with the Un-protection.

Likewise the first embodiment, the respective nodes relay the frame from the user's terminal device as the transmission source to the user's terminal device as the transmission destination in accordance with the address contained in the frame. For example, in the case where the user's terminal device connected to the node 100A as the starting node transmits the frame to the user's terminal device connected to the node 100K as the terminal node indicated by the address contained in the frame, the frame is transmitted from the node 100A to the node 100K via the E-NNI domain 242.

Likewise the first embodiment, the starting node which requires connection to the communication route formed by signaling is set as the node 100A in the present embodiment. The terminal node at the terminal end of the communication route is set as the node 100K. The relay nodes through which communication is conducted on the communication route are set as the nodes 100B to 100J.

Likewise the first embodiment, the reference point management on the control plane is executed with the layer structure in the present embodiment. In the case where the communication is conducted through different domains, the different service levels may be applied to the respective domains by signaling between the contact nodes of the domains. The processing in the domain is performed using the generally employed technology.

FIG. 17 is a diagram illustrating an exemplary structure of a score table according to the second embodiment. A score table 151B illustrated in FIG. 17 is a table for storing the score information likewise the score table 151A according to the first embodiment, and is stored in the table storage memory 104 (described referring to FIG. 3) of the node 100. The score information is referred upon selection of the next communication path by the node 100, indicating the score allocated to the service level of the communication path. Likewise the score table 151A according to the first embodiment, the score table 151B includes such items as "service level value", "service level type", and "score".

The user who requires formation of the communication route in the communication system (described referring to FIG. 16) according to the present embodiment sets the passing point with respect to the communication route based on the service level available for the communication path in the respective I-NNI domains and the score information stored in the score table 151B in the communication route required to be formed. The score is added in accordance with the service level selected by the respective nodes on the communication route formed by the communication system. The sum total value of the final score is compared with the passing point to determine whether or not the communication route is to be formed.

Generally, in the communication system using the optical transmission network as in the present embodiment, such service levels as 1+1 protection (APS), UPSR, 2F-BLSR, and 4F-BLSR may be supplied. Each service level has both advantageous and disadvantageous points with respect to the redundancy. It is therefore difficult to determine the best level. For example, the service level 1+1 protection (APS) is economically advantageous, but may be inferior to the other services with respect to the failure avoidance. Meanwhile, the service level 4F-BLSR is economically inferior, but may be superior with respect to the failure avoidance. The manager of the communication system and the user of the system construct the network by mixing those service levels appropriately or use the communication route.

Generally, as the service level available for each I-NNI domain is set, the user of the communication system easily gets the information with respect to the specific service level available for the specific I-NNI domain. The user of the communication system is easily capable of obtaining the knowledge with respect to the structure of the network in the communication system. It is considered that the user of the communication system generally places importance on the excellent redundancy with respect to the available service level. Accordingly, the manager for setting the score information or the user is considered to have more chances to highly evaluate the communication path and the service level (that is, setting high score in the score information). For example, the user generally sets the highest score to the 4F-BLSR among the 4F-BLSR, UPSR, 1+1 protection (APS) with respect to the I-NNI domain adapted thereto, and sets the lowest score to the level 1+1 protection (APS) selected thereamong.

It is possible to set the appropriate passing point of the service level of the communication route in accordance with the performance required with respect to the communication route based on the communication system network structure and the selectable service level. Based on the passing point, the communication system formed of the node 100 determines whether or not the communication route is to be formed.

In the present embodiment, likewise the first embodiment, the aforementioned service level is available on the communication path of the communication system. However, any other service level such as the restoration type/reversion strategy may be made available without being limited to the aforementioned structure. For example, such service level as PCA (BLSR), Protection Dedicated, Shared protection, Fast Reroute, Reroute, Link Disjoint protection, Node Disjoint protection, SRLG Disjoint protection, Co-route VCAT/LCAS LINK, Co-route VCAT/LCAS NODE and other service levels may be made available.

If the aforementioned service level is made available on the communication path of the communication system, the available service level, the corresponding service level value and the score are set in the score table 151B. The score corresponding to the available service level is calculated to allow determination to be made whether or not the communication route is to be formed by the terminal node.

In the second embodiment, the determination may be made whether or not the communication route is to be formed while prioritizing the redundancy.

The aforementioned embodiments only depict the principle of the communication device, system and method. The embodiments are not limited to the accurate structure and applications as described above, and allow those skilled in the art to make various changes and modifications. All the corresponding modified examples and equivalents are regarded as being within the range of accompanying claims and equivalents thereof. The structure of each part may be replaced by the arbitrary structure having the same function, and any other structure and steps may be added. Two or more arbitrary structures among those described above may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A communication device being operable to form a communication route, the communication device comprising:
    a score information storage unit operable to store score information indicating a score as an evaluated value of a communication path connecting with an adjacent communication device, the score information includes data set by a user evaluation;
    a receiver unit operable to receive a route connection notice including current score information indicating a current score as an evaluated value of a partial communication route from a communication device being at a starting point on a communication route to a communication path that has been routed on the communication route;
    a routing unit being operable to acquire the score information stored in the score information storage unit, and select the communication path next to the communication path that has been routed as the partial communication route, based on the acquired score information of the communication path;
    a score updating unit operable to add a score of the communication path selected by the routing unit to the current score of the partial communication route indicated by the current score information received by the receiver unit, the score being acquired based on the score information stored in the score information storage unit, and update the current score information to the added score as a new current score; and
    a transmission unit operable to transmit the route connection notice including the current score information updated by the score updating unit to a next adjacent communication device, the updated current score information being used to form the communication route.

2. The communication device according to claim 1, in case that the communication device is placed at a starting point of the communication route, comprising:
    a route connection notice generation unit operable to generate the route connection notice including the current score information in which an initialized score is set, and
    wherein the transmission unit transmits the route connection notice generated by the route connection notice unit to the next adjacent communication device on the communication route.

3. The communication device according to claim 1, in case that the communication device is placed at a terminal end of the communication route, further comprising:
    a route connection determination unit operable to evaluate the communication route based on the current score information received by the receiver unit, and determine either to form the communication route in case that an evaluation result of the communication route satisfies a predetermined condition or to cancel a formation of the communication route in case that the evaluation result fails to satisfy the predetermined condition.

4. The communication device according to claim 3, wherein:
    the route connection notice includes passing score information indicating a passing score of the current score in case that communication paths have been routed from a starting point to a terminal end of the communication route; and
    the route connection determination unit determines either to form the communication route in case that the current score is equal to or higher than the passing score or to cancel a formation of the communication route in case that the current score is lower than the passing score.

5. The communication device according to claim 3, wherein the route connection notice includes route information indicating the communication devices forming the communication route, comprising:
    a terminal determination unit operable to determine whether or not the communication device is placed at the terminal end based on the route information.

6. The communication device according to claim 3, comprising:
    a request match notice generation unit operable to generate a request match notice used as a notification to form the communication route in case that the route connection determination unit determines to form the communication route, and wherein the transmission unit transmits the request match notice to the communication device placed at a starting point of the communication route through the communication devices forming the communication route.

7. The communication device according to claim 1, wherein the route connection notice is used to request a formation of the communication route to the communication device operable to form the communication route.

8. The communication device according to claim 1, wherein:
the route connection notice includes communication path type information used to define a type of the communication path considered for consideration as the communication route, and
the routing unit selects the communication path as the partial communication route based on the communication path type information.

9. The communication device according to claim 1, wherein:
the route connection notice includes route information indicating the communication devices forming the communication route, and
the routing unit selects the communication path as the partial communication route based on the route information.

10. The communication device according to claim 1, comprising:
a band reservation unit operable to reserve a band for a communication path selected by the routing unit; and
a band validation unit operable to validate the band reserved by the band reservation unit in case that the receiver unit receives a request match notice used as notification to form the communication route by the communication device placed at a terminal end of the communication route, and
wherein the receiver unit receives the request match notice transmitted from the communication device placed at the terminal end of the communication route.

11. The communication device according to claim 1, wherein the routing unit selects the communication path with a highest evaluation as the partial communication route based on the score indicated in the score information.

12. The communication device according to claim 1, wherein the score indicated in the score information is set such that the communication path with a high reliability is highly evaluated.

13. The communication device according to claim 1, in case that the communication device is placed at a starting point of the communication route, wherein the routing unit evaluates the communication path based on the score information stored in the score information storage unit so as to select a first communication path from the communication device placed at the starting point of the communication route as the partial communication route.

14. The communication device according to claim 1, wherein the routing unit selects the communication path between the communication device and the next communication device on the communication route as the partial communication route.

15. The communication device according to claim 1, wherein:
the score information includes an evaluated score of a service level denoting reliability of the communication path on the communication route; and
the routing unit evaluates the communication path based on the score information stored in the score information storage unit so as to select the service level of the communication path next to the communication path that has been routed as the partial communication route.

16. The communication device according to claim 15, wherein:
the communication path has at least one service level,
the route connection notice includes service level information indicating the service level selectable by the routing unit, and
the routing unit evaluates the communication path based on the service level included in the route connection notice and the score information stored in the score information storage unit so as to select the service level of the communication path next to the communication path that has been routed as the partial communication route.

17. The communication device according to claim 1, wherein the communication route is divided by a region of communication network formed by the specified communication devices from among the communication devices forming the communication route.

18. The communication device according to claim 1, wherein the routing unit acquires the score information stored in the score information storage unit, and evaluates the communication path based on the acquired score information of the communication path so as to select the communication path next to the communication path that has been routed as the partial communication route.

19. A communication system on which a communication route is formed, the communication route being formed by a plurality of communication devices, the communication system comprising:
a relaying communication device placed at a relaying point of the communication route;
the relaying communication device comprising:
a score information storage unit being operable to store score information indicating a score as an evaluated value of a communication path connecting to an adjacent communication device;
a receiver unit being operable to receive a route connection notice including current score information indicating a current score as an evaluated value of a partial communication route from a starting communication device on the communication route to the communication path that has been routed on the communication route, the route connection notice being transmitted from the communication device of the communication route next to the relaying communication device;
a routing unit being operable to acquire the score information stored in the score information storage unit, and select the communication path next to the communication path that has been routed as a part of the communication route based on the acquired score information of the communication path;
a score updating unit being operable to add a score of the communication path selected by the routing unit to the current score of the partial communication route indicated by the current score information received by the receiver unit, the score being acquired based on the score information stored in the score information storage unit, and update the current score information to the added score as a new current score; and
a transmission unit being operable to transmit the route connection notice including the current score information updated by the score updating unit to a next adjacent communication device;

a starting communication device placed at a starting point of the communication route; and the starting communication device comprising:
 a route connection notice generation unit being operable to generate the route connection notice including the current score information in which an initialized score is set; and
 a transmission unit being operable to transmit the route connection notice generated by the route connection notice unit to the relaying communication device that is the next adjacent communication device on the communication route;
 a terminal communication device placed at a terminal end of the communication route;

the terminal communication device comprising:
 a receiver unit being operable to receive the route connection notice transmitted from the communication device of the communication route next to the terminal communication device; and
 a route connection determination unit being operable to evaluate the communication route based on the current score information received by the receiver unit, and determine to form the communication route in case that an evaluation result of the communication route satisfies a predetermined condition, determine to cancel a formation of the communication route in case that the evaluation result fails to satisfy the predetermined condition.

20. A communication method to form a communication route formed by a plurality of communication devices, the communication method comprising:
 receiving a route connection notice including current score information indicating a current score as an evaluated value of a partial communication route from a communication device being at a starting point on the communication route to a communication path that has been routed on the communication route;
 acquiring the current score information indicating a score as an evaluated value of a communication path, the score information includes data set by a user evaluation;
 selecting a communication path next to the communication path that has been routed as the partial communication route based on the acquired score information of the communication path;
 adding a score of the selected communication path to the current score of the partial communication route indicated by the received current score information, the score being acquired based on the score information;
 updating the current score information to the added score as a new current score; and
 transmitting the route connection notice including the updated current score information to a next adjacent communication device, the updated current score information being used to form the communication route.

* * * * *

UNITED STATES PATENT AND TRADEMARK OFFICE
CERTIFICATE OF CORRECTION

PATENT NO.        : 8,320,278 B2
APPLICATION NO.   : 12/640301
DATED             : November 27, 2012
INVENTOR(S)       : Koji Takeguchi et al.

It is certified that error appears in the above-identified patent and that said Letters Patent is hereby corrected as shown below:

On the Title Page; Under Item (73) Assignee, delete "Fujitsu Limited, Kawaskai (JP)" and insert -- Fujitsu Limited, Kawasaki (JP) --, therefor.

Signed and Sealed this
Third Day of June, 2014

Michelle K. Lee
*Deputy Director of the United States Patent and Trademark Office*